(12) United States Patent
Korzunov

(10) Patent No.: US 9,507,877 B2
(45) Date of Patent: Nov. 29, 2016

(54) METHOD OF AND SYSTEM FOR STORING SPATIAL OBJECTS

(71) Applicant: YANDEX EUROPE AG, Lucerne (CH)

(72) Inventor: Anton Vasilyevich Korzunov, Moscow Region (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/921,034

(22) Filed: Oct. 23, 2015

(65) Prior Publication Data
US 2016/0154897 A1 Jun. 2, 2016

Related U.S. Application Data

(63) Continuation of application No. PCT/IB2015/051804, filed on Mar. 12, 2015.

(30) Foreign Application Priority Data

Dec. 1, 2014 (RU) ................................ 2014148287

(51) Int. Cl.
*G06F 17/30* (2006.01)
(52) U.S. Cl.
CPC ... *G06F 17/30958* (2013.01); *G06F 17/30961* (2013.01)
(58) Field of Classification Search
None
See application file for complete search history.

(56) References Cited

U.S. PATENT DOCUMENTS

| 5,461,712 A | 10/1995 | Chelstowski et al. |
| 5,671,406 A | 9/1997 | Lubbers et al. |

(Continued)

FOREIGN PATENT DOCUMENTS

EP 1178466 B1 4/2005

OTHER PUBLICATIONS

International Search Report from PCT/IB2015/051804; Jul. 13, 2015; Blaine R. Copenheaver.

(Continued)

*Primary Examiner* — James A Thompson
(74) *Attorney, Agent, or Firm* — BCF LLP

(57) ABSTRACT

A computer-implemented method of organization of a plurality of objects contained in a quadrant tree into a singly linked linear list, comprising: placing a first, a second, a third and a fourth markers of a first level, that correspond to a first, a second, a third and a fourth elements of the first level of the quadrant tree, into the singly linked linear list; placing respective objects stored in any of: the first, the second, the third and the fourth element of the first level of the quadrant tree after a respective one of the first, the second, the third and the fourth marker of the first level accordingly into the singly linked linear list; placing a first, a second, a third and a fourth markers of the second level, that correspond to a first, a second, a third and a fourth elements of the second level of the quadrant tree, into the singly linked linear list; placing objects stored in any one of: the first, the second, the third and the fourth element of the second level of the quadrant tree into the singly linked linear list, the placing executed after the first, the second, the third and the fourth markers of second level accordingly.

16 Claims, 12 Drawing Sheets

(56) References Cited

U.S. PATENT DOCUMENTS

| | | |
|---|---|---|
| 6,526,176 B1 | 2/2003 | Kovacevic et al. |
| 6,917,711 B1 | 7/2005 | Wang et al. |
| 8,214,371 B1 | 7/2012 | Ramesh et al. |
| 8,639,725 B1 | 1/2014 | Udeshi et al. |
| 2005/0174351 A1 | 8/2005 | Chang |
| 2011/0087425 A1 | 4/2011 | Deng et al. |
| 2012/0166446 A1* | 6/2012 | Bowman ........... G06F 17/30327 707/743 |

OTHER PUBLICATIONS

Johnson, Damn Cool Algorithms: Spatial indexing with Quadtrees and Hilbert Curves, http://blog.notdot.net/2009/11/Damn-Cool-Algorithms-Spatial-indexing-with-Quadtrees-and-Hilbert-Curves, retrieved on Aug. 11, 2014.

Shaffer et al., Optimal Quadtree Construction Algorithms, Computer Vision, Graphics, and Image Processing 37, 402-419, 1987.

Samet, The Design and Analysis of Spatial Data Structures, University of Maryland, Addison-Wesley Publishing Company Inc., Series in Computer Science, Preface-pp. 1-493, 1989.

* cited by examiner

METHOD OF AND SYSTEM FOR STORING SPATIAL OBJECTS

CROSS-REFERENCE

The present application claims priority to Russian Patent Application No. 2014148287, filed Dec. 1, 2014, entitled "СИСТЕМА И СПОСОБ ХРАНЕНИЯ ПРОСТРАНСТВЕННЫХ ОБЪЕКТОВ" (METHOD OF AND SYSTEM FOR STORING SPATIAL OBJECTS) and is a continuation of PCT/IB2015/051804 filed on Mar. 12, 2015, entitled "METHOD OF AND SYSTEM FOR STORING SPATIAL OBJECTS" the entirety of which are incorporated herein.

FIELD OF THE TECHNOLOGY

Present technology relates to systems for and methods of storing the spatial objects.

BACKGROUND

In modern computer technologies the spatial object placing usually includes the partitioning of the space (scene) in smaller parts. The partitioning may be performed in various ways. One of the methods is the partitioning of the space into quadrants. In computer graphics the partitioning of the space (into quadrants, octants and so on) is usually implemented while the data is processed by the graphical conveyor to simplify future calculations and minimize the quantity of the objects to be processed by the graphical conveyor. In US patent application 20030227455 A1 "Grid-based loose octree for spatial partitioning" it has been described in greater detail.

Once the space is partitioned and all the objects of this space were identified to the suitable cells, the results are usually stored in the determined data structure for further use by graphical data processing components, such as a game engine or an animation generator. Data structure is usually generated after the generating of the scene and prior to its visualization and prior to user interaction with the scene. At the moment of visualization it might be necessary to find on the scene the object corresponding to the chosen point. Upon receiving the corresponding point, for example, in two-dimensional coordinates (e.g. coordinate axes x, y) the data structure allows performing the search therein in order to find the information associated with the object.

The search of the object in the quadrant tree is a relatively simple process and wouldn't require a significant computational power.

The receiving of the list of all objects located in the specific element of the quadrant tree and in all of its child elements requires a significant computational power.

Thus, although the conventional computer systems are decent, the improvement of these systems is still possible.

SUMMARY

It is an object of the present technology to ameliorate at least some of the inconveniences present in the prior art.

According to a first broad aspect of the present technology, there is provided a computer-implemented method of organization of a plurality of objects contained in a quadrant tree into a singly linked linear list. The quadrant tree includes elements of the quadrant tree, each element of the quadrant tree being one of: a node of the quadrant tree or a leaf of the quadrant tree. The method comprises: (i) placing a first, a second, a third and a fourth markers of a first level, that correspond to a first, a second, a third and a fourth elements of the first level of the quadrant tree, into the singly linked linear list; (ii) placing respective objects stored in any of: the first, the second, the third and the fourth element of the first level of the quadrant tree after a respective one of the first, the second, the third and the fourth marker of the first level accordingly into the singly linked linear list.

In some implementations, an n-element of the quadrant tree is one of: the first element of the first level of the quadrant tree, the second element of the first level of the quadrant tree, the third element of the first level of the quadrant tree and the fourth element of the first level of the quadrant tree, and wherein the n-element comprises four elements of a second level of the quadrant tree, the method further comprising: (i) placing a first, a second, a third and a fourth markers of the second level, that correspond to a first, a second, a third and a fourth elements of the second level of the quadrant tree, into the singly linked linear list, and wherein the placing is executed after one of: (a) a marker of the first level related to the n-element of the quadrant tree, and before directly following first marker of a third level, when the fourth element of the second level of quadrant tree is a quadrant tree node; (b) a marker of the first level related to the n-element of the quadrant tree, and before a directly following another marker of the same level when the n-element of the first level of quadrant tree is one of: the first, the second, the third element of the first level of quadrant tree, and when the fourth element of the second level of quadrant tree is a leaf of quadrant tree; (c) the fourth marker of the first level, when the n-element of the first level of the quadrant tree is the fourth element of the first level of quadrant tree, and when the fourth element of the second level of quadrant tree is a leaf of the quadrant tree; (ii) placing objects stored in any one of: the first, the second, the third and the fourth element of the second level of the quadrant tree into the singly linked linear list, the placing executed after the first, the second, the third and the fourth markers of second level accordingly.

In some implementations, the method further comprises: (i) receiving a new object, (ii) placing the new object into an o-element of the quadrant tree, (iii) placing the new object in the singly linked linear list after a marker related to the o-element of the quadrant tree.

In some implementations, the object is a tag of a graphical object.

In some implementations, the element of the quadrant tree comprises the reference to the marker in the singly linked linear list, related to that quadrant tree element.

In some implementations, the n-element of the quadrant tree, being a parent element, has four child elements, the method further comprising receiving a user request for providing to the user a list of objects placed in said n-element of the quadrant tree and in said four child elements of the second level of the quadrant tree.

In some implementations, the user request is made by selection of a corresponding fragment of space by the user.

In some implementations, the method further comprises identifying the n-element of the quadrant tree as corresponding to the fragment of the space selected by user, and identifying the n-element of the quadrant tree as corresponding to the fragment of the space selected by user is executed by selecting a smallest element of the quadrant tree from all of the quadrant tree elements fully covering the user-selected fragment of space.

In some implementations, the method further comprises providing the list of objects, placed in said n-element of the quadrant tree and in said four child elements of the second level of the quadrant tree, by selecting objects placed in the singly linked linear list in a certain interval, the certain interval being one of: (i) an interval from the marker of the first level related to the n-element of the quadrant tree until the next marker of the first level, when the n-element of the quadrant tree is one of the: the first, the second and the third element of the first level of quadrant tree; (ii) an interval starting at the fourth marker of the first level, the fourth marker related to the n-element of the quadrant tree, and finishing at the last object in the singly linked linear list, including said object, when the n-element of the quadrant tree is the fourth element of the first level of the quadrant tree.

In some implementations, a plurality of objects in any of the elements of the second level of the quadrant tree is constant, the method further comprising transforming a part of the singly linked linear list, where said plurality of objects is placed, into an array, such that the dimensionality of the array is representative of the number of the objects in said plurality of objects, and said element of the second level of the quadrant tree comprises plurality of indexes, each index of said plurality of indexes corresponding to a specific object from said plurality of objects.

In some implementations, a plurality of objects in an at least one child element of the n-element of the quadrant tree is constant, the method further comprising providing a list of objects, placed in said n-element of the first level of the quadrant tree and in said four child elements of the second level of the quadrant tree, by providing the objects placed in: (i) the singly linked linear list in a certain interval, and the certain interval is selected as one of: (a) an interval starting at the marker of the first level related to the n-element of the quadrant tree until the next marker of the first level, when the n-element of the quadrant tree is one of the: the first, the second and the third element of the first level of the quadrant tree; (b) an interval starting at the marker of the first level related to the n-element of the quadrant tree and finishing at the last object in the singly linked linear list, including this last object, when the n-element of the quadrant tree is the fourth element of the first level of the quadrant tree; and (ii) all the arrays generated as the result of transformation of an at least one child element of the n-element of the first level of quadrant tree, which the at least one child element of the n-element of the first level of quadrant tree comprise a constant plurality of objects.

In some implementations, the first level of the quadrant tree is any level of the quadrant tree, and the second level of the quadrant tree is a lower level of the quadrant tree, which directly follows the first level of the quadrant tree.

According to a second aspect of the present technology, there is provided a computer. The computer includes a processor. The processor is configured to render the computer to execute: (i) placing a first, a second, a third and a fourth markers of a first level, that correspond to a first, a second, a third and a fourth elements of the first level of the quadrant tree, into the singly linked linear list; (ii) placing respective objects stored in any of: the first, the second, the third and the fourth element of the first level of the quadrant tree after a respective one of the first, the second, the third and the fourth marker of the first level accordingly into the singly linked linear list.

In some implementations, an n-element of the quadrant tree is one of: the first element of the first level of the quadrant tree, the second element of the first level of the quadrant tree, the third element of the first level of the quadrant tree and the fourth element of the first level of the quadrant tree, and wherein the n-element comprises four elements of a second level of the quadrant tree, and wherein the processor is configured to render computer further to execute: (i) placing a first, a second, a third and a fourth markers of the second level, that correspond to a first, a second, a third and a fourth elements of the second level of the quadrant tree, into the singly linked linear list, and wherein the placing is executed after one of: a marker of the first level related to the n-element of the quadrant tree, and before directly following first marker of a third level, when the fourth element of the second level of quadrant tree is a quadrant tree node; a marker of the first level related to the n-element of the quadrant tree, and before a directly following another marker of the same level when the n-element of the first level of quadrant tree is one of: the first, the second, the third element of the first level of quadrant tree, and when the fourth element of the second level of quadrant tree is a leaf of quadrant tree; the fourth marker of the first level, when the n-element of the first level of the quadrant tree is the fourth element of the first level of quadrant tree, and when the fourth element of the second level of quadrant tree is a leaf of the quadrant tree; (ii) placing objects stored in any one of: the first, the second, the third and the fourth element of the second level of the quadrant tree into the singly linked linear list, the placing executed after the first, the second, the third and the fourth markers of second level accordingly.

In some implementations, the processor is configured to render the computer to execute: (i) receiving a new object, (ii) placing the new object into an o-element of the quadrant tree, (iii) placing the new object in the singly linked linear list after a marker related to the o-element of the quadrant tree.

In some implementations, object is the tag of graphical object.

In some implementations, the element of the quadrant tree comprises the reference to the marker in the singly linked linear list, related to that quadrant tree element.

In some implementations, the n-element of the quadrant tree, being a parent element, has four child elements, and the processor is configured to render the computer to execute receiving a user request for providing to the user a list of objects placed in said n-element of the quadrant tree and in said four child elements of the second level of the quadrant tree.

In some implementations, the user request is made by selection of a corresponding fragment of space by the user.

In some implementations, the processor is configured to render the computer to execute identifying the n-element of the quadrant tree as corresponding to the fragment of the space selected by user, and identifying the n-element of the quadrant tree as corresponding to the fragment of the space selected by user is executed by selecting a smallest element of the quadrant tree from all of the quadrant tree elements fully covering the user-selected fragment of space.

In some implementations, the processor is configured to render the computer to execute providing the list of objects, placed in said n-element of the quadrant tree and in said four child elements of the second level of the quadrant tree, by selecting objects placed in the singly linked linear list in a certain interval, the certain interval being one of: (i) an interval from the marker of the first level related to the n-element of the quadrant tree until the next marker of the first level, when the n-element of the quadrant tree is one of the: the first, the second and the third element of the first level of quadrant tree; (ii) an interval starting at the fourth marker of the first level, the fourth marker related to the n-element of the quadrant tree, and finishing at the last object in the singly linked linear list, including said object, when the n-element of the quadrant tree is the fourth element of the first level of the quadrant tree.

In some implementations, a plurality of objects in any of the elements of the second level of the quadrant tree is constant, the processor is configured to render the computer to execute transforming a part of the singly linked linear list, where said plurality of objects is placed, into an array, such that the dimensionality of the array is representative of the number of the objects in said plurality of objects, and said element of the second level of the quadrant tree comprises plurality of indexes, each index of said plurality of indexes corresponding to a specific object from said plurality of objects.

In some implementations, a plurality of objects in an at least one child element of the n-element of the quadrant tree is constant, the processor is configured to render the computer to execute providing a list of objects, placed in said n-element of the first level of the quadrant tree and in said four child elements of the second level of the quadrant tree, by providing the objects placed in: (i) the singly linked linear list in a certain interval, and the certain interval is selected as one of: (a) an interval starting at the marker of the first level related to the n-element of the quadrant tree until the next marker of the first level, when the n-element of the quadrant tree is one of the: the first, the second and the third element of the first level of the quadrant tree; (b) an interval starting at the marker of the first level related to the n-element of the quadrant tree and finishing at the last object in the singly linked linear list, including this last object, when the n-element of the quadrant tree is the fourth element of the first level of the quadrant tree; and (ii) all the arrays generated as the result of transformation of an at least one child element of the n-element of the first level of quadrant tree, which the at least one child element of the n-element of the first level of quadrant tree comprise a constant plurality of objects.

In some implementations, the first level of the quadrant tree is any level of the quadrant tree, and the second level of the quadrant tree is a lower level of the quadrant tree, which directly follows the first level of the quadrant tree.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, "electronic device" is associated with a user. Thus, some non-limiting examples, the electronic device may include personal computers (desktops, laptops, netbooks, etc.), smartphones, and tablets, as well as network equipment such as routers, switches, and gateways. It should be understood, that in the present context the fact that the device functions as the electronic device does not mean that it cannot function as a server for other electronic devices. Using of the expression "electronic device" does not mean that several electronic devices may not be involved in receiving/sending, carrying out or causing to be carried out any task or request, or the consequences of any task or request, or any steps of the method, disclosed in the present description.

In the context of the present specification, a "database" is any structured collection of data, irrespective of its particular structure, database management software, or computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present technology "object" means an element that exists in real or virtual space. Object can be a point, a line, a plane, a three-dimensional structure or a multidimensional structure. For the purpose of saving of memory space in various data hierarchal structures, the object might be represented by a tag of the object (or simply "tag"). In cases where the object is represented by the tag, the tag is considered to be the "object". The tag may have spatial coordinates. The tag may also comprise the information about the size of the object. The tag may also comprise the information about the form of the object. The tag may comprise other information. In some implementations of present technology, the tag may be connected with an external database storing the additional information about the object (for example, detailed information about the object including its size, assessed value, sale price, the amount of annual taxes due, etc.).

In the context of the present specification, a term "quadrant tree" ("4-tree", "quadrotree", "quadtree") is meant to include a hierarchal data structure, comprising a plurality of quandrant tree elements (quadrant tree nodes and quadrant tree leaves) of various levels. The quadrant tree is generated and maintained generally for the creating and maintaining spatial databases. It is used for recursive partitioning the space into four regions (quadrants). Quadrants can be squared and rectangular. The quadrant tree can store information about point, linear and plane objects. The quadrant tree can have various implementations. The quadrant tree can have the following common properties: (a) quadrant tree partitions the space into quadrants; (b) each quadrant has a maximum capacity; when the maximum capacity is achieved the cell splits; (c) a linear tree corresponds to the spatial partitioning of the quadrant tree.

In the context of the description of the present technology "quadrant tree element" is meant to include an element of the hierarchal data structure. Quadrant tree elements are the quadrant tree nodes and quadrant tree leaves of various levels.

In the context of the description of the present technology "leaf of the quadrant tree" is meant to include the quadrant tree element that does not have any "children". The key of the leaf of the quadrant tree contains two components (for x and y coordinates).

In the context of the description of the present technology "quadrant tree node" is meant to include the quadrant tree element that stores the information of objects having four "children" (one for each quadrants). A key of the given node contains two components (for x and y coordinates). Children of the given quadrant tree node can be quadrant tree nodes of the following level or quadrant tree leaves of the following level, or quadrant tree nodes of the following level and quadrant tree leaves of the following level.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer information storage medium" or simply "computer readable medium" are intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage medium, including two or more media components of a same type and/or two or more media components of different types.

In the context of the present specification, the words "n-element", "o-element" are meant to include descriptive elements for the purpose of separating the nouns, to simplify understanding which elements are referred to. In each case it is indicated what exactly is meant by the elements marked with letter signs. The fact that some element is marked, for example, as n-element does not automatically mean that it can't be o-element as well.

In the context of the present specification, the expression "singly linked linear list" is meant to include a dynamic data structure containing the nodes of the list, and each node comprises the data itself as well as a link to the following node in the list (except the last node which comprises data but may not comprise the link). In the present description these nodes are the markers and the objects, and the object could be, but not limited to, graphical object tags.

In present description the term "array" ("row") is meant to include a set of the same type of components (elements) located in a memory directly after each other and might be accessed by the index (indices). Unlike the singly linked linear list, the array is a structure which allows for a random access.

In the context of the present specification, the words "first", "second", "third", etc. have been used as adjectives only for the purpose of allowing for distinction between the nouns that they modify from one another, and also for the purpose of identifying the relative level sequence of the quadrant tree. Thus, for example, it should be understood that terms "first level of the quadrant tree" and "second level of the quadrant tree" do not meant that, for example, "first level of the quadrant tree" is a root level for "second level of the quadrant tree". In fact, "first level of the quadrant tree" could be any level of the quadrant tree, if the counting is executed from the root level of quadrant tree. Likewise, "second level of the quadrant tree" should not necessarily be the second level of the quadrant tree if the counting is executed from the root level of quadrant tree. At the same time, using of the expressions "first level of the quadrant tree" and "second level of the quadrant tree" means that the second level of the quadrant tree is following directly after the first level of the quadrant tree. In other words, if the "first level of the quadrant tree" in fact is a seventh level of the quadrant tree, starting from the root level of the quadrant tree, "second level of the quadrant tree" would be the eighth level of the quadrant tree, starting from the root level of the quadrant tree.

In the context of the present specification, when it doesn't concern the levels of the quadrant tree, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the servers, nor is their use (by itself) intended to imply that any "second server" must necessarily exist in any given situation. Moreover, as it has been noted in present description relating to other embodiments of technology, the link to the "first" element and the "second" element does not mean that the two elements can not be implemented as one physical element in the real world. Thus, for example, in some cases "first" server and "second" server could be implemented as the same component of the software and/or hardware, and in some other cases they can be implemented on the different software and/or hardware.

Implementations of the present technology each have at least one of the above-mentioned object and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects, and advantages of embodiments of the present disclosure will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
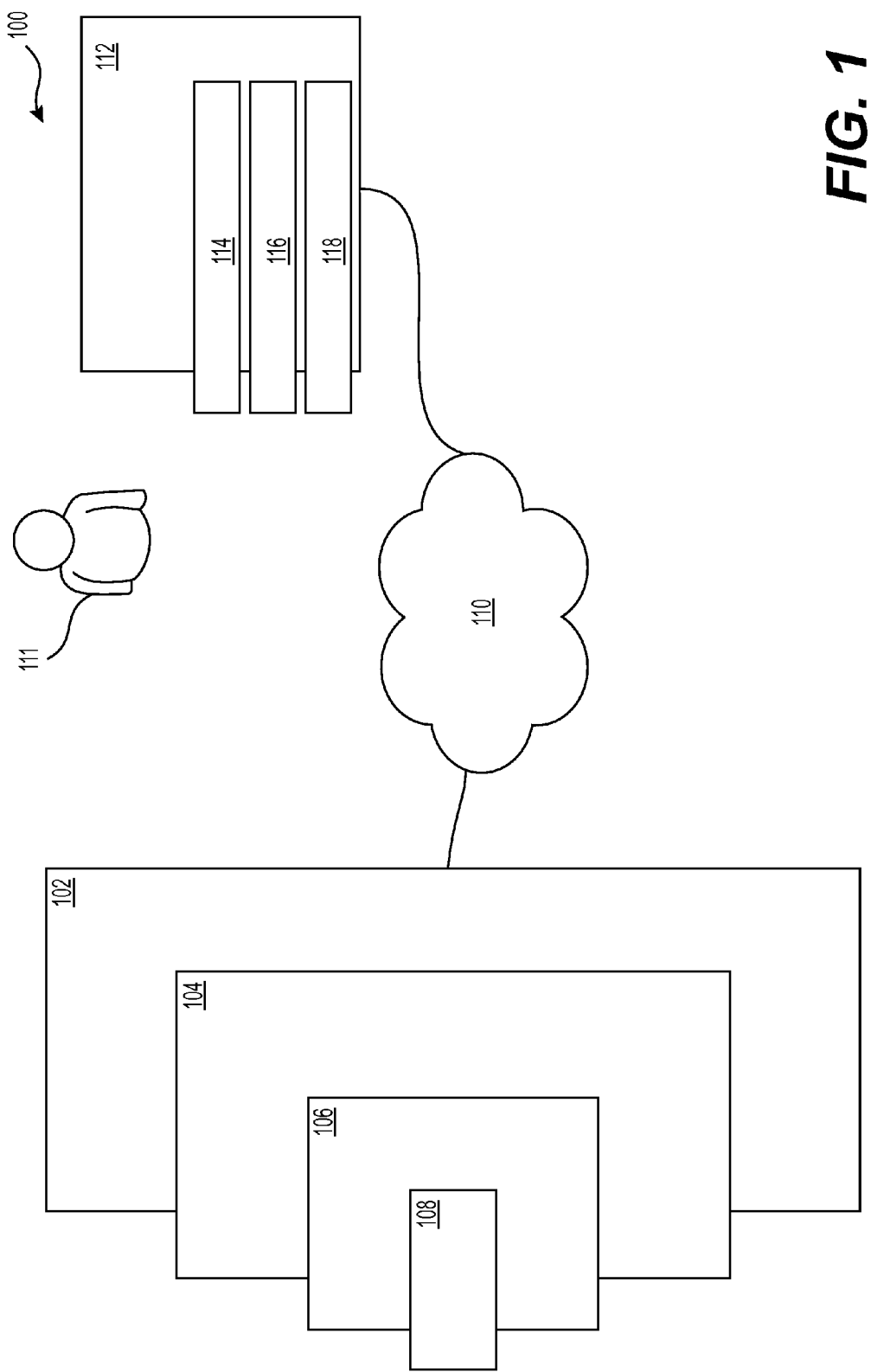
FIG. 1 is a schematic representation of an embodiment of networked computer systems implementing the present technology.

In FIG. 1 there is depicted a schematic diagram of various computer systems 100 which are connected to each other via communication network 110. It is to be expressly understood that computer systems 100 are depicted as the illustrative implementations of the present technology. Thus, the following description should be considered only as the description of illustrative implementations of the present technology. This description is not intended to define the scope or set forth the bounds of the present technology. In some cases, what are believed to be helpful examples of modifications to computer systems 100 may also be described below. This is done merely as an aid to understanding, and, again, not to define the scope or set forth the bounds of the present technology. These modifications are not an exhaustive list, and, as a person skilled in the art would understand, other modifications are likely possible. Further, where no examples of modifications have been set forth, it should not be interpreted that no modifications are possible and/or that what is described is the sole manner of implementing that, element of the present technology. As a person skilled in the art would understand, this is likely not the case. In addition it is to be understood that the computer systems 100 may provide in certain instances simple implementations of the present technology, and that where such is the case they have been presented in this manner as an aid to understanding. As persons skilled in the art would understand, various implementations of the present technology may be of a greater complexity.

The system 100 includes a server 102. The server 102 may be implemented as a conventional computer server. In an example of an embodiment of the present technology, the server 102 may be implemented as a Dell™ PowerEdge™ Server running the Microsoft™ Windows Server™ operating system. Needless to say, the server 102 may be implemented in any other suitable hardware and/or software and/or firmware or a combination thereof. In the depicted non-limiting embodiment of present technology, the server 102 is a single server. In alternative non-limiting embodiments of the present technology, the functionality of the server 102 may be distributed and may be implemented via multiple servers.

In some implementations, the server 102 can be under control and/or management of a map service provider, for example, provider of Yandex.Maps™. As such, the server 102 may be configured to execute one or more searches responsive to the search query to the map service entered a the user 111 into a browser 116 of am electronic device 112 connected to the server 102 via the communication network 110. The server 102 is also configured to transmit to the electronic device 112 a search result to be displayed to the user 111 of the electronic device 112 on a display 118 via the browser 116. These functions are well known in the art and will not be described here at any length.

The server 102 includes an information storage medium 104 that might be used by the server 102. Generally, the information storage medium 104 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof.

The implementations of the server 102 are well known in the art. So, suffice it to state, that each of the server 102 comprises inter alia a network communication interface (such as a modem, a network card and the like) (not depicted) for two-way communication over the communications network 110; and a processor (not depicted) coupled to the network communication interface, the processor being configured to execute various routines, including those described herein below. To that end the processor may store or have access to computer readable instructions which instructions, when executed, cause the processor to execute the various routines described herein.

The storage medium 104 of the server 102 is intended to store data including computer-readable instructions and databases.

More specifically, the information storage medium 104 of the server 102 stores a database 106 that maintains a quadrant tree 108 (the quadrant tree 108 being the hierarchal data structure). The quadrant tree 108 comprises a plurality of n-tree elements (n-tree nodes and n-tree leaves) of various levels. The quadrant tree 108 is generated and maintained generally for the creating and maintaining spatial databases. The quadrant tree 108 is used for recursive separating the space into four regions. Each element of the quadrant tree 108 representing the region has the maximum capacity; when maximum capacity of the element of the quadrant tree 108 is achieved the region and the element of the quadrant tree 108 separates. The quadrant tree 108 corresponds to the spatial partitioning of the quadrant tree 108.

The storage medium 104 of the server 102 also stores computer-readable instructions that manage control, updates, populating and modifications of the databases. More specifically, computer-readable instructions from the storage medium 104 allow the server 102 to receive (update) the object data from the electronic device 112 via communication network 110, to place the indicated objects into the quadrant tree 108, to change the location and/or the properties of the indicated objects in the quadrant tree 108, to delete the indicated objects from the quadrant tree 108, to receive from the electronic device 112 via communication network 110 the user 111 requests to provide the list of objects associated with a certain part of a space, to receive from the database 106 object data stored in the elements of the quadrant tree 108, the data corresponding to the part of space which the user 111 is interested in, and to transmit the list to the electronic device 112 associated with the user 111 via the communication network 110.

The server 102 is connected to communication network 110 via communication link (not numbered). In some non-limiting embodiments of the present technology, the communication network 110 can be implemented as the Internet. In other embodiments of the present technology, the communication network 110 can be implemented differently, such as any wide-area communication network, local-area communication network, a private communication network and so on.

How the communication link is implemented is not particularly limited and will depend on which devices are connected to the communication network 110. As a non-limiting example, the communication link interlinking the server 102 to the communication network 110 can be implemented via a wired connection (such as an Ethernet based connection). At the same time, other devices could be also connected in other ways. In those examples, where the connected device is implemented as a wireless communication device (e.g. electronic device 112 implemented as a smart-phone), the connection can be implemented as a wireless communication network (such as but not limited to, a 3G communications network link, a 4G communications network link, a Wireless Fidelity, or WiFi® for short, Bluetooth® and the like). In those examples, where device 102 is implemented as a desktop computer (e.g. electronic device 112), the communication link can be either wireless or wired (such as an Ethernet based connection).

It should be expressly understood that various implementations of the server 102, the electronic device 112, the communication links for the connection to the communication network 110 are provided for illustration purposes only. As such, those skilled in the art will easily appreciate other specific implementational details for the server 102, the electronic device 112 and the communication links for the connection to the communication network 110. Thus, by no means, examples provided herein above are meant to limit the scope of the present technology.

The server 102 is connected to the electronic device 112 via the communication network 110. The electronic device 112 is typically associated with the above-mentioned user 111. The user 111 may be an entity receiving the object data. As a non-limiting example, user 111 can be a potential buyer of real estate, and he executes a search in a spatial database which content is populated by the owners of property and/or realtors with information about real estate available for sale and/or rent. As another non-limiting example, the user 111 can be a driver—the owner of the GPS navigator, the driver executing a request for availability, location and working hours of gas stations, located nearby.

It should be noted that the fact that the electronic device 112 is associated with the user 111 does not need to suggest or imply any mode of operation—such as a need to log in, a need to be registered or the like.

The implementation of the electronic device 112 is not particularly limited, but as an example, the electronic device 112 may be implemented as a personal computer (desktops, laptops, netbooks, etc.), a wireless communication device (a cell phone, a smartphone, a tablet and the like), as well as network equipment (a router, a switch, or a gateway). In FIG. 1 electronic device 112 is implemented as a Dell Precision T1700 MT CA033PT170011RUWS personal computer with Intel® Xeon™ processor, CPU frequency: 3300 MHz, VIDIA Quadro K1080 videocard with running operation system Windows 7 Pro 64-bit.

The electronic device 112 includes an information storage medium 114. Generally, computer usable information storage medium 114 may be implemented as a medium of any nature and kind whatsoever, including RAM, ROM, disks (CD-ROMs, DVDs, floppy disks, hard drivers, etc.), USB keys, solid state-drives, tape drives, etc. and also the combinations thereof. In the electronic device 112 depicted at FIG. 1, the information storage medium 114 is implemented as a hard drive with 500 Gb of memory. The information storage medium 114 can store user files and program instructions. In particular, storage medium can store the software for using as browser 116.

Generally, the purpose of the browser 116 is to allow the user 111 to connect to the server 102, to submit requests for information, to receive information from the server 102 and to display received information on the display 118. In the electronic device 112, the browser 116 can be implemented as Yandex™ browser. However, as a person skilled in the art would understand, the implementation of the browser 116 is not particularly limited. As a non-limiting example, such browsers can be implemented as: Google Chrome™, Internet Explorer™, various mobile search applications and alike. It should be expressly understood that any other commercially available or proprietary application can be used for implementing non-limiting embodiments of the present technology.

As has been alluded to above, the electronic device 112 is connected to communication network 110 via communication link (not numbered).

The electronic device 112 also includes the above mentioned display 118. The display 118 can be implemented as a Dell™ E2214H 2214-7803 21.5″ monitor with 1920×1080 resolution that allows providing video-information to the user 111. The display 118 is configured to display, via the above-mentioned browser 116, information received from the server 102. For example, user 121 can see on the display 118 all real estates on sale within certain town or certain part of it, or all land plots within cadastral quarter.

Figure 2:
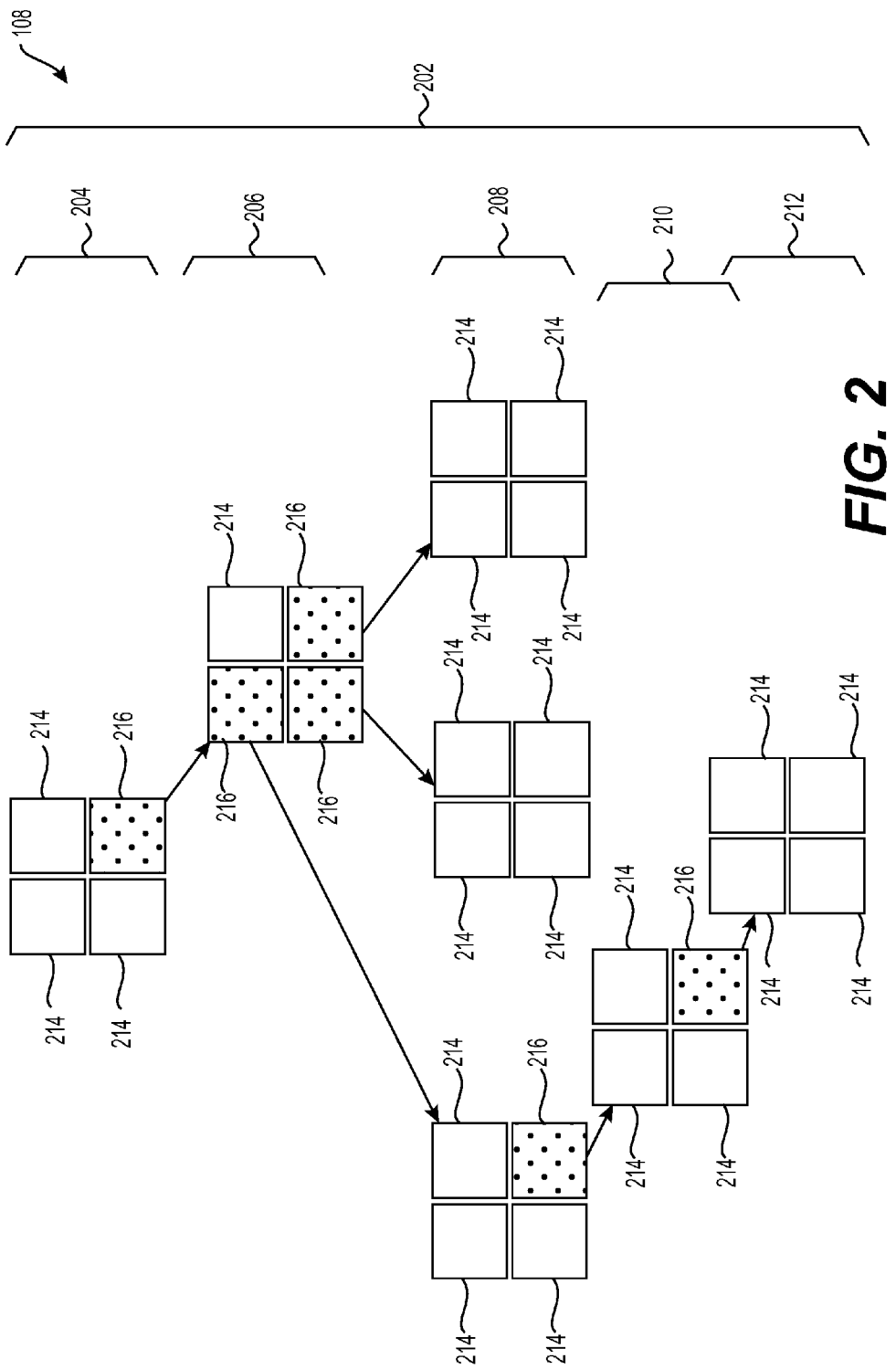
FIG. 2 is a schematic representation showing structure and components of a quadrant tree.

FIG. 2 is a schematic representation showing the structure and the components of the quadrant tree 108.

The quadrant tree 108 is a hierarchal data structure. The quadrant tree 108 includes a plurality of elements 202 of quadrant tree 108, namely: nodes 216 of quadrant tree 108 and leaves 214 of quadrant tree 108 of different levels.

In example of the FIG. 2 the quadrant tree 108 includes elements 202 of quadrant tree 108 of five levels, namely: (a) four elements 202 of a first level 204 being in this case one node 216 of quadrant tree 108 and three leaves 314 of the quadrant tree 108, (b) four elements 202 of a second level 206 being in this case three nodes 316 of the quadrant tree 108 and one leaf 214 of quadrant tree 108, (c) eleven elements 202 of third level 208 being in this case one node 216 of quadrant tree 108 and twelve leaves 214 of quadrant tree 108, (d) four elements 202 of fourth level 210 being in this case one node 216 of quadrant tree 108 and three leaves 214 of quadrant tree 108, (e) four elements 202 of a fifth level 212 being in this case four leaves 214 of the quadrant tree 108.

For the purpose of illustration, nodes 216 of the quadrant tree 108 are depicted in FIG. 2 as filled squares and leaves 214 of the quadrant tree 108 are depicted as empty squares.

In this example first level 204 is the highest level and elements 202 of the first level 204 are "root elements".

The fifth level 212 depicted in FIG. 2 is the lowest level in this example. In other examples the lowest level could be different (e.g. sixth, seventh and so on).

A "parent" element is higher than a "child" element.

The quadrant tree 108 is generated and maintained generally for the building and maintaining spatial databases. It is used for recursive separating the space into four regions.

A non-limiting example of using the quadrant tree 108 includes a map service, where each object can be located in certain place of a two-dimensional map and be marked as a point, a plane or any other type of an object. Two-dimensional objects can be recursively partitioned into the four quadrants. These four quadrants being elements 202 of the first level 204 can be recursively partitioned into four elements 202 of the second level 206. Each of the four elements 202 of the second level 206 can include objects located in corresponding one of the four map quadrants. Some elements 202 of the second level 206 received as a result of the partitioning of one element 202 of the first level 204 can be partitioned, in turn, into four elements 202 of the third 208 etc. As a result, elements (quadrants) being partitioned into four elements (quadrants) of the next level are quadrant tree nodes 216, and unpartitioned elements (quadrants) are quadrant tree leaves 214.

Another non-limiting example of using of the quadrant tree 108 can be a database of two-dimensional objects used in computer games.

Another non-limiting example of using of the quadrant tree 108 can be a database of real estate objects that can be used by realtors and/or other entities.

The quadrant tree 108 can have following properties: (a) the quadrant tree 108 partitions the space into quadrants; (b) each quadrant has a maximum capacity, and when maximum capacity is achieved the quadrant separates; (c) direction of the quadrant tree 108 corresponds to the spatial partitioning.

Figure 3:
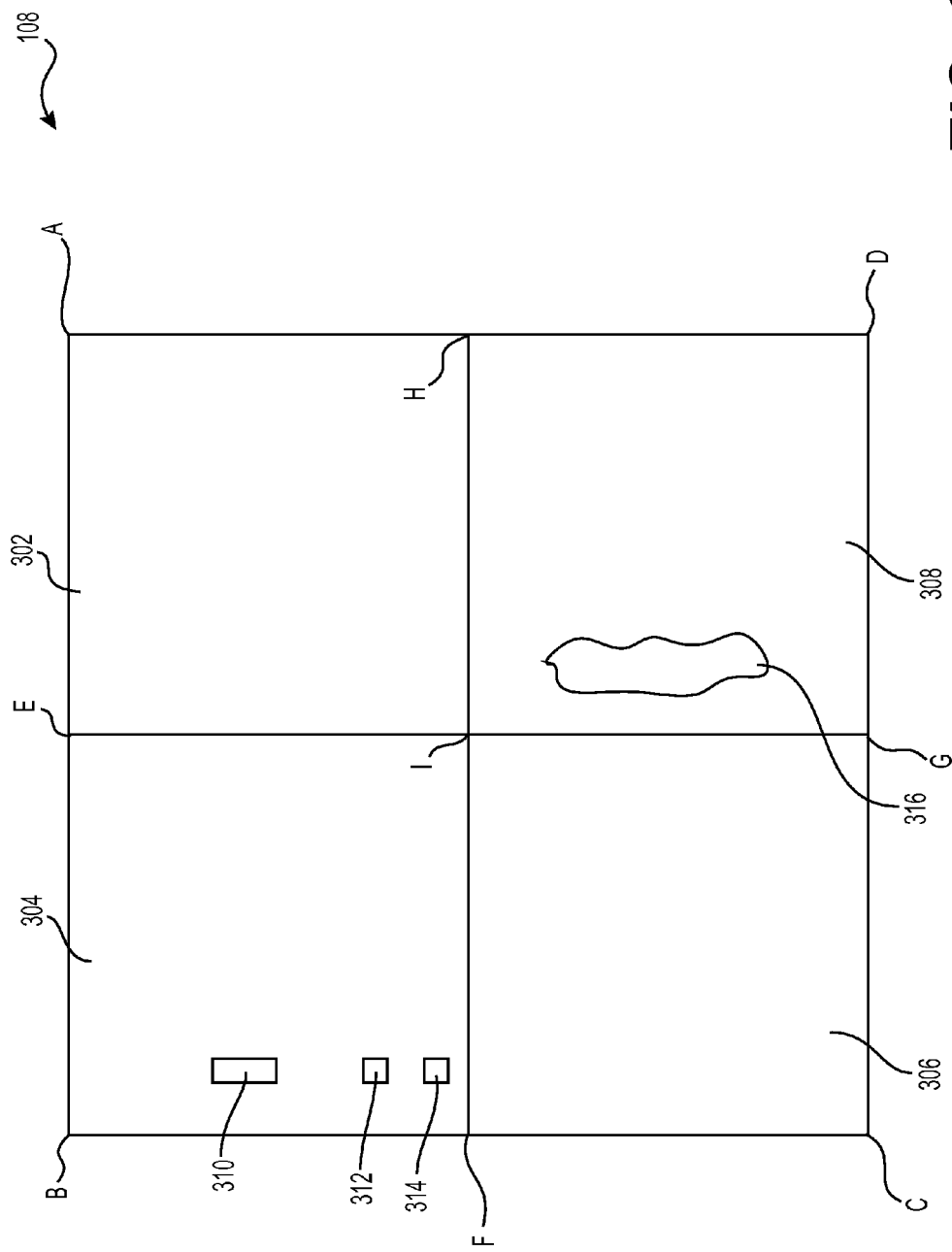
FIG. 3 is a schematic representation of four elements of a first level of the quadrant tree depicted on the FIG. 2 with objects placed within.

FIG. 3 is a schematic representation of four elements 202 of the first level 204 of the quadrant tree 108 depicted on the FIG. 2.

As was mentioned earlier, in this example the first level 204 of the quadrant tree 108 includes four root elements 202 of the quadrant tree 108, three of which, in this case, are quadrant tree leaves 214, and one element 202 is a quadrant tree node 216.

As depicted in FIG. 3, three leaves 214 of the quadrant tree 108 are leaves represented by squares with vertices AEIH (a leaf 302), EBFI (a leaf 304), IFCG (a leaf 306). The only node 216 of first level 204 is the node represented by square with vertices IGDH (a node 308).

From the four elements 202 of the quadrant tree 108 of the first level 204 two elements—the leaf 204 and the node 308—contain objects.

Thus, the leaf 304 contains an object 310, an object 312 and an object 314.

The node 308 contains an object 316.

In this implementation of present technology, the object 310, the object 312, the object 314 and the object 316 are references to different graphical objects. The object 310, the object 312, the object 314 and the object 316 are stored in elements 202 of the first level 204 of the quadrant tree 108.

The node 308 is a quadrant tree node and, correspondingly, has four child elements 202 of the quadrant tree 108. The four child elements 202 are nodes 216 of the quadrant tree 108 of the second level 206 and one leaf 214 of the quadrant tree 108 of the second level 206, as depicted in FIG. 2.

Each element 202 of the quadrant tree 108 can further include indication to a marker (not depicted) in a singly linked linear list corresponding to the element 202 in order to align the quadrant tree 108 structure with the singly linked linear list structure. As such, an indication to marker can show the beginning of a portion of the linear which stores the objects from the corresponding element of quadrant tree 108.

Figure 4:
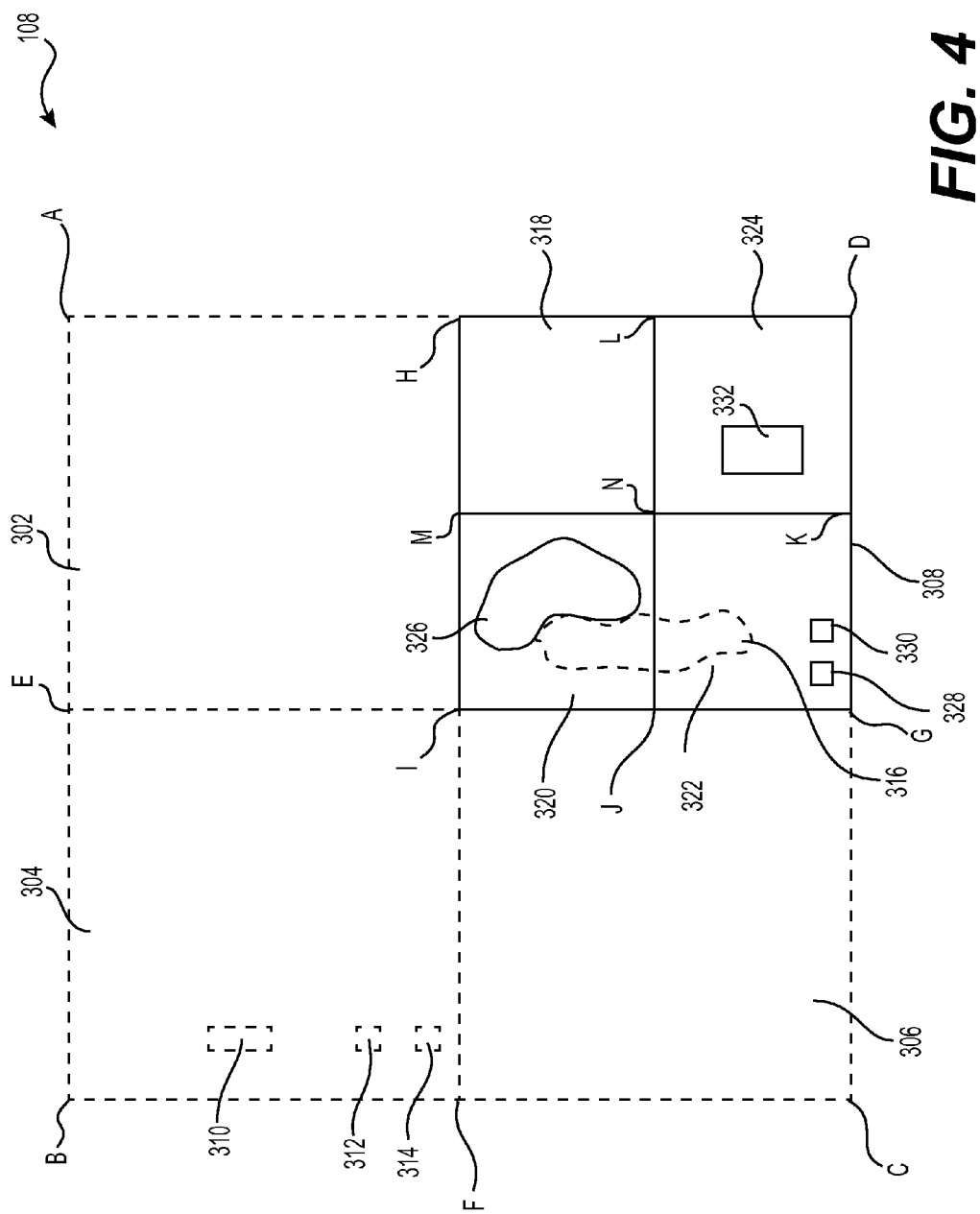
FIG. 4 is a schematic representation of four elements of a second level of the quadrant tree depicted on the FIG. 2.

FIG. 4 is a schematic representation of four elements 202 of the second level 206 of the quadrant tree 108 depicted on the FIG. 2.

As was mentioned earlier, in this case the second level 206 of the quadrant tree 108 includes four elements 202 of the quadrant tree 108, three of which are quadrant tree nodes 216, and one element 202 is a quadrant tree node 214.

Depicted in FIG. 4, elements 202 of the quadrant tree 108 which are presented as squares with vertices MIJN, NJGK and LNKD are quadrant tree nodes 216 (in this case they are marked correspondingly as a node 320, a node 322 and a node 324).

Depicted in FIG. 4, the element 202 of the quadrant tree 108 which is presented as a square with vertices HMNL is a quadrant tree leaf 214 (in this case it is marked as a leaf 318).

The node 320 contains an object 326.

The node 322 contains two objects—an object 330 and an object 328.

The node 324 contains an object 332.

In FIG. 4 are also depicted, in dotted line, the objects 310, 312, 314 and 316 which are located in the elements 202 of the first level 204. As such, the object 316 is not located in any of nodes 214 of the second level 206: neither the node 320, nor the node 322. The object 316 is located in the node 308 of the first level 204 depicted in FIG. 3.

In this implementation of present technology, the object 326, the object 328, the object 330 and the object 332 are tags of different graphical objects. These tags are stored in the elements 202 of the second level 206 of the quadrant tree 108.

The nodes 318, 320, 322 are quadrant tree nodes, and, correspondingly, each of them has four child elements 202 of the quadrant tree 108 of the third level 208, as depicted in FIG. 2.

The implementation of the elements 202 of the third level 208 (as well as elements of lower levels) can be similar to the implementation described above. As such, the objects located in the elements 202 of the third level 208 and lower levels will not be described here at any length.

Figure 5:
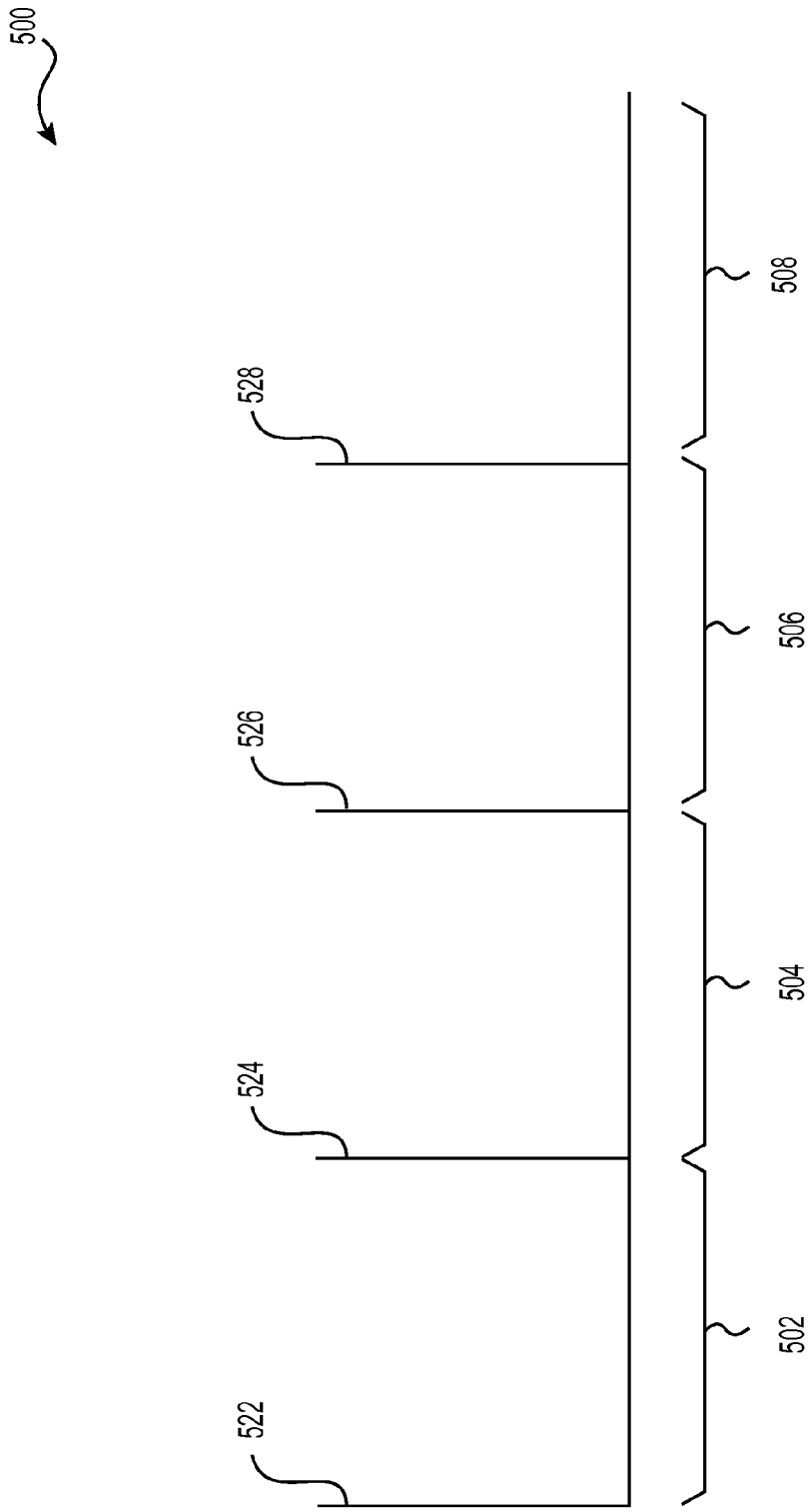
FIG. 5 is a schematic representation of an embodiment of singly linked linear list which contains markers of the first level, the singly linked linear list being implemented in accordance with non-limiting embodiments of the present technology.

FIG. 5 is a schematic representation of a singly linked linear list 500 with markers of the first level 204 located therein. FIG. 5 will be described below along with the description of FIG. 10 that is a schematic flowchart of a method 1000 executed on the server 102.

Figure 6:
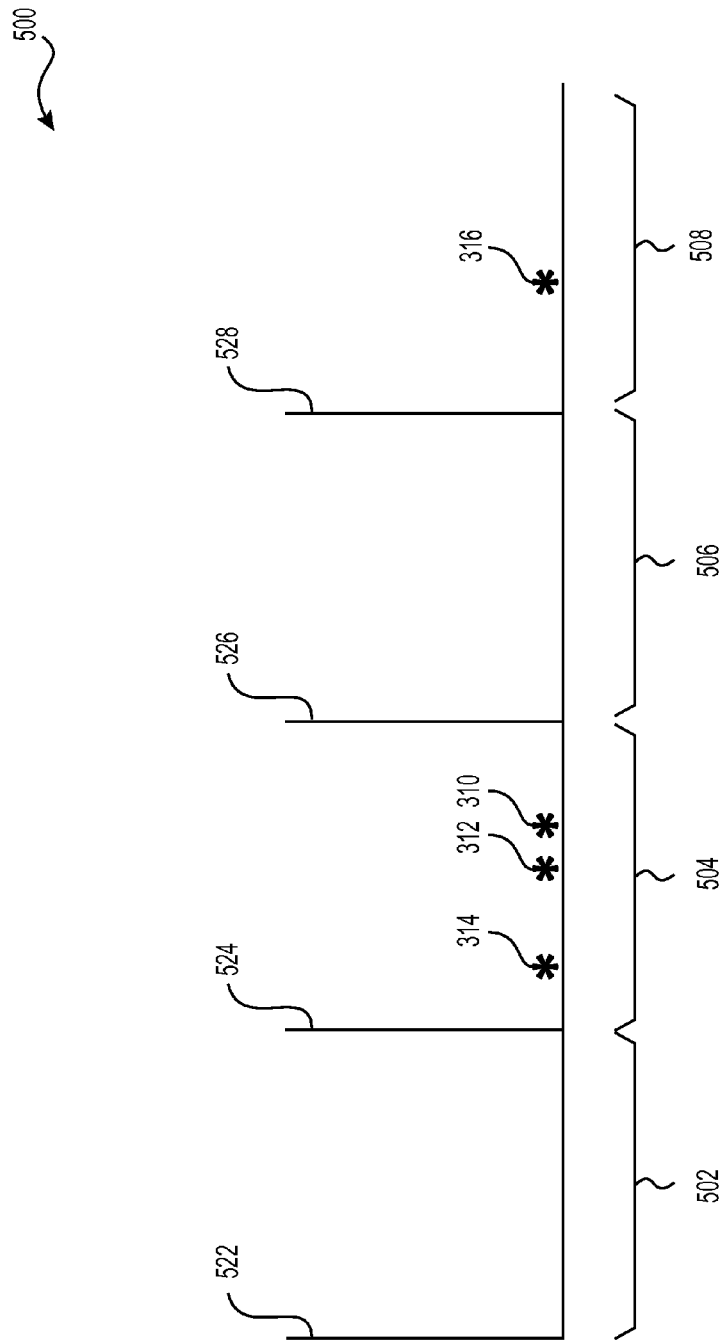
FIG. 6 is a schematic representation of an embodiment of the singly linked linear list which contains markers of the first level and objects from elements of the first level of the quadrant tree of FIG. 2, the singly linked linear list being implemented in accordance with non-limiting embodiments of the present technology.

FIG. 6 is a schematic representation of the singly linked linear list 500 with markers 522, 524, 526, 528 of the first level 204 located therein along with the objects from elements 202 of first level 204 of the quadrant tree 108. FIG. 6 will also be described below along with the description of FIG. 10.

Figure 7:
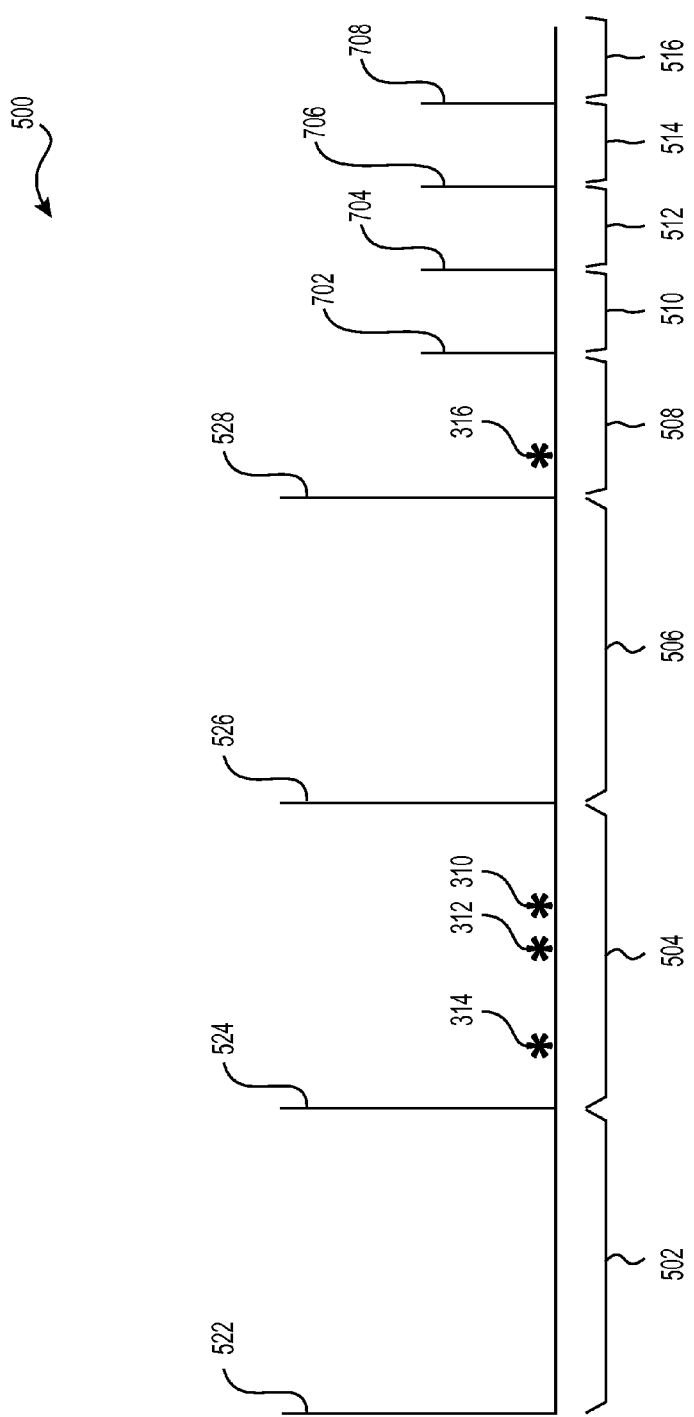
FIG. 7 is a schematic representation of an embodiment of the linear list of FIG. 2 which contains markers of the first level and the second level, and the singly linked linear list further containing objects from elements of the first level of the quadrant tree, the singly linked linear list implemented in accordance with non-limiting embodiments of the present technology.

FIG. 7 is a schematic representation of the singly linked linear list 500 which contains markers of the first level and the second level, and the singly linked linear list 500 contains objects from elements of the first level of the quadrant tree 108. FIG. 7 will also be described below along with the description of FIG. 10.

Figure 9:
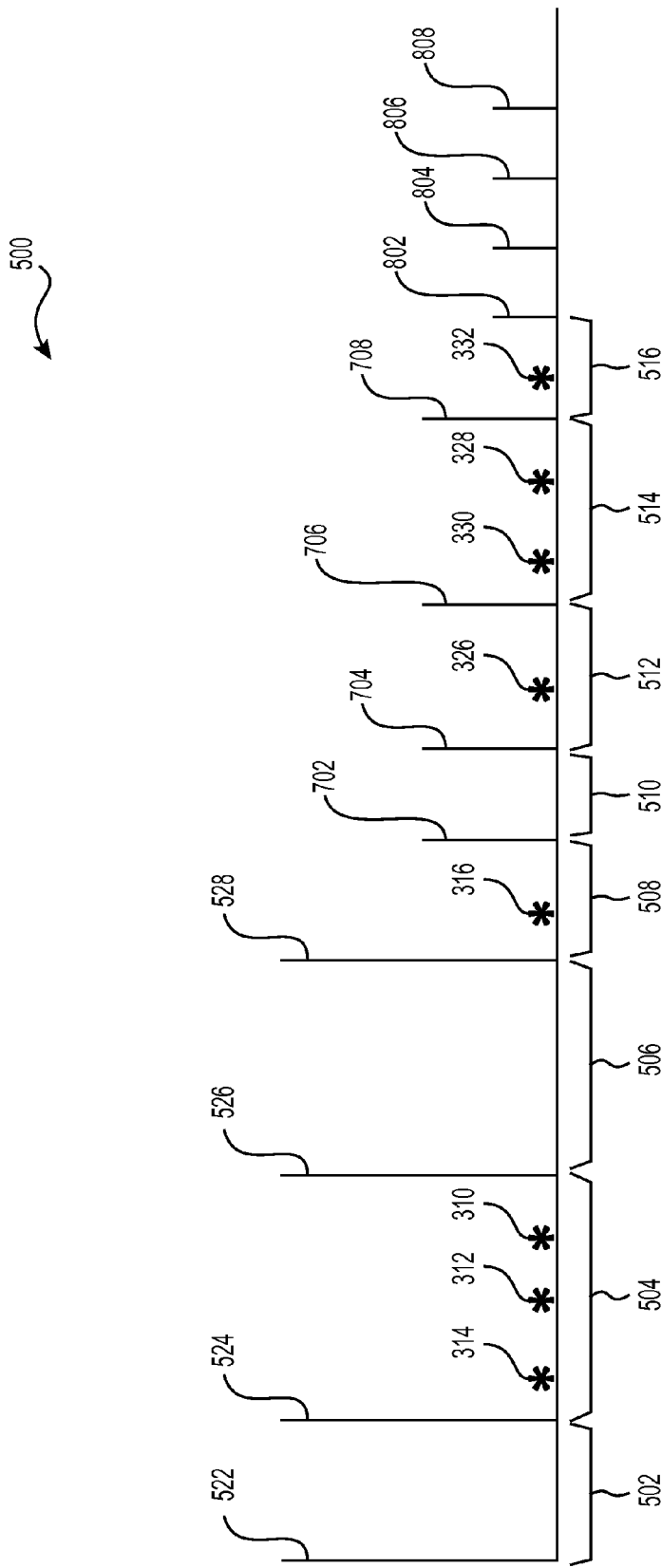
FIG. 9 is a schematic representation of an embodiment of the singly linked linear list which contains markers of the first, the second and the third level, and the singly linked linear list further containing objects from elements of the first, the second and the third level of the quadrant tree, the singly linked linear list implemented in accordance with non-limiting embodiments of the present technology.

FIG. 9 is a schematic representation of the singly linked linear list 500 which contains markers of the first level and the second level, and the singly linked linear list 500 contains objects from elements of the first level and the second level of the quadrant tree 108. FIG. 9 will also be described below along with the description of FIG. 10.

Figure 10:
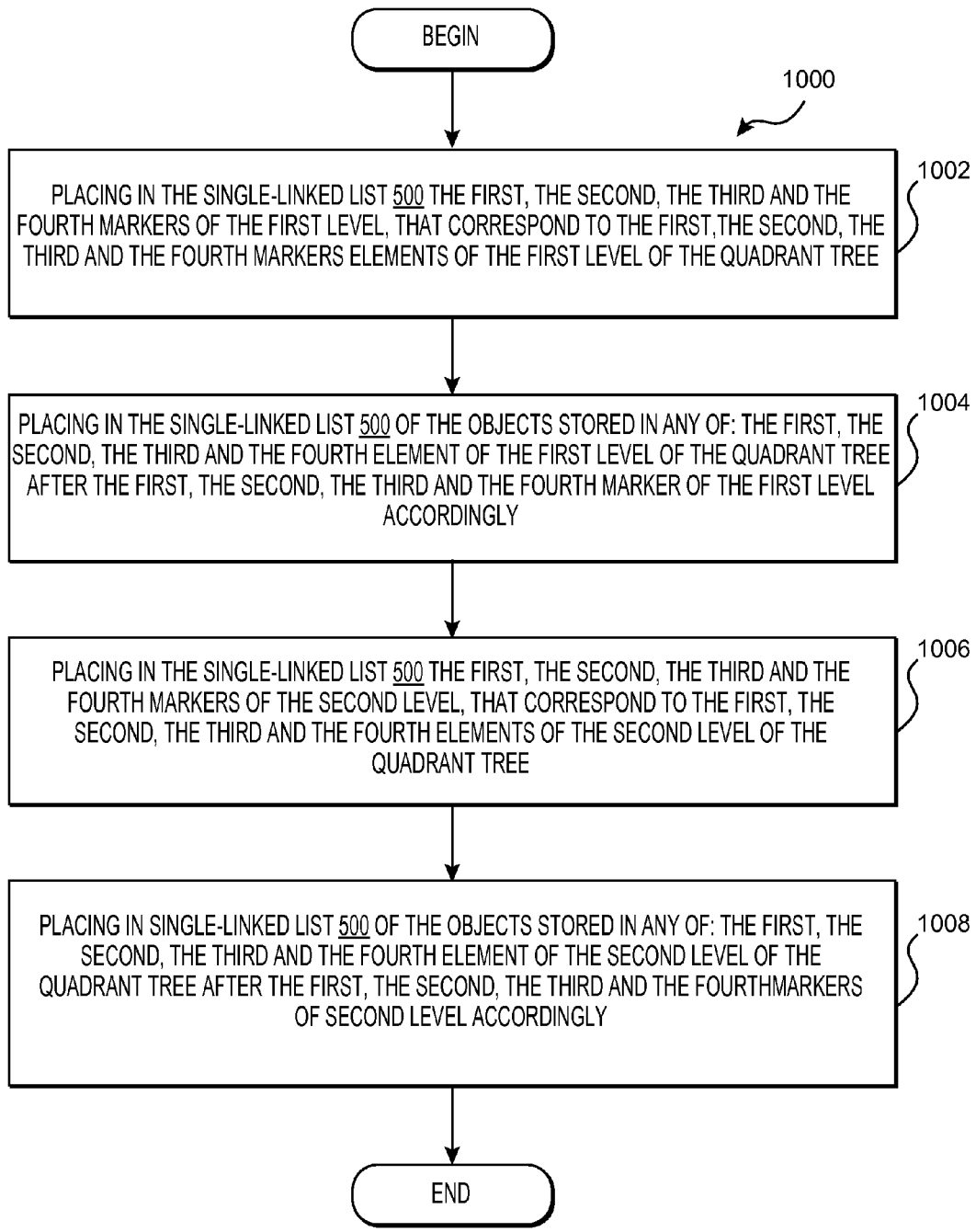
FIG. 10 is the schematic flowchart of a method implemented on the server, depicted of the FIG. 1, the method being implemented in accordance with non-limiting embodiments of the present technology

FIG. 10 is the schematic flowchart of the method 1000, implemented on the server 102, depicted on the FIG. 1, the method 1000 being implemented in accordance with non-limiting embodiments of the present technology.

In some embodiments of present technology the method 1000 can be executable at the server 102 depicted in FIG. 1. For that purpose the server 102 includes the storage medium 104 storing computer-readable instructions which when executed cause the server 102 to execute the steps of the method 1000. However, as known to those skilled in the art, the method 1000 can be executed on other servers.

Step 1002—placing in the singly linked linear list the first, the second, the third and the fourth markers of first level, that correspond to the first, the second, the third and the fourth elements of the first level of the quadrant tree.

Method 1000 begins at the step, where the server 102 depicted in FIG. 1 provides placing in the singly linked linear list 500 schematically depicted in FIG. 5, of a first marker of the first level 522, a second marker of the first level 524, a third marker of the first level 526 and a fourth marker of the first level 528.

Markers are references to the beginning of the associated part of the singly linked linear list 500 wherein objects, located in corresponding element of the quadrant tree 108, is located. Since each level of the quadrant tree 108 has four quadrants, the number of markers corresponding to these four quadrants is four. Since elements of the quadrant tree 108 may relate to different levels, the markers also can relate to different levels. As such, the total number of markers may correspond to the number of elements of the quadrant tree 108. For example, referring to FIG. 2, there is a following number of quadrant tree elements: 4 elements of the first level, 4 elements of the second level, 12 elements of the third level, 4 elements of the fourth level and 4 elements of the fifth level. Accordingly, the singly linked linear list may contain the following markers: 4 markers of the first level, 4 markers of the second level, 12 markers of the third level, 4 markers of the fourth level and 4 markers of the fifth level.

FIG. 5 depicts the first marker of first level 522, the second marker of the first level 524, the third marker of the first level 526 and the fourth marker of the first level 528.

The first marker of the first level 522 is an reference to a beginning of a portion 502 of the singly linked linear list 500, where objects, located in the leaf 302 of the first level 204 of the quadrant tree 108, are located.

The second marker of the first level 524 is an reference to the beginning of a portion 504 of the singly linked linear list 500, where objects, located in the leaf 304 of the first level 204 of the quadrant tree 108, are located.

The third marker of the first level 526 is an reference to the beginning of a portion 506 of the singly linked linear list 500, where objects, located in the leaf 306 of the first level 204 of the quadrant tree 108, are located.

The fourth marker of the first level 528 is an reference to the beginning of a portion 508 of the singly linked linear list 500, where objects, located in the node 308 of the first level 204 of the quadrant tree 108, are located.

As those skilled in the art will understand, markers 522, 524, 526, 528 of the first level as well as other markers in the singly linked linear list 500 are nodes of the singly linked linear list 500. That means that markers are not only references to the beginning of the certain portions of the singly linked linear list 500 but also contain respective links to next singly linked linear list node. Thus, next singly linked linear list node may be any other marker or object.

Further, method 1000 proceeds to step 1004.

Step 1004—placing in singly linked linear list of the objects stored in any of: the first, the second, the third and the fourth element of the first level of the quadrant tree after the first, the second, the third and the fourth marker of the first level accordingly.

At step 1000, the server 102 paces objects stored in the elements of the first level of the quadrant tree 108 into the singly linked linear list 500.

The placing in the singly linked linear list 500 of the objects stored in elements of first level of quadrant tree 108 is done after the corresponding markers of the first level, as shown in FIG. 6.

FIG. 6 is a schematic representation of the singly linked linear list 500 with markers 522, 524, 526, 528 of the first level located therein along with the objects from elements of the first level 204 of the quadrant tree 108, namely: with the objects 310, 312, 314 and 316.

As was shown in FIG. 3, two of the four elements of the first level 204 of the quadrant tree 108 do not comprise objects (i.e. the leaf 302 and the leaf 306) and another two elements of the first level 204 of the quadrant tree 108 do comprise objects (i.e. the leaf 304 and the node 308).

Thus, the leaf 304 contains objects 310, 312 and 314. The node 308 contains one object 316. Accordingly, these objects are placed in the singly linked linear list 500 after the corresponding markers.

Objects 310, 312 and 314 associated with the second element of the first level 204 of the quadrant tree 108 are located after the second marker of the first level 524, i.e. in the portion 504 of the singly linked linear list 500.

Object 316 associated with the second element of the first level 204 of the quadrant tree 108 is located after the second marker of the first level 528, i.e. in the portion 508 of the singly linked linear list 500.

As it shown in FIG. 6, the first marker of the first level 522 comprises a link to the second marker of the first level 524. The second marker of the first level 524, in turn, comprises a link to the object 314. The object 314 contains a link to the object 312. The object 312 contains a link to the object 310. The object 310 contains a link to the third marker of the first level 526. The third marker of the first level 526 comprises a link to the fourth marker of the first level 528. The fourth marker of the first level 528 comprises a link to the object 316. The object 316 is the last node in the singly linked linear list 500 and, therefore, has no links.

In some implementations of the present technology, the method 1000 further comprises receiving new objects. For example, new objects can be received in response to placing new real estate objects for sale when the quadrant tree 108 is used for storing information about real estate objects. Received new objects are placed into corresponding elements of the quadrant tree 108 and concurrently into the corresponding portion of the singly linked linear list 500. The newly received object can be placed into the singly linked linear list 500 after the respective marker related to the corresponding element of the quadrant tree 108. One should recall that the the second element of the first level (the node 304) originally contained only two objects—the object 310 and the object 312—so after adding the new object—an object 314, the object 314 can be added in the very beginning of the corresponding portion (i.e. the portion 504) of the singly linked linear list 500, i.e. after the corresponding marker 524.

The method 1000 them proceeds to step 1006.

Step 1006—placing in the singly linked linear list the first, the second, the third and the fourth markers of second level, that correspond to the first, the second, the third and the fourth elements of the second level of the quadrant tree.

At step 1006, the server 102 places the first, the second, the third and the fourth markers of the second level (that correspond to the first, the second, the third and the fourth elements of the second level of the quadrant tree 108) into the singly linked linear list 500.

Placing the first, the second, the third and the fourth markers of second level, that correspond to the first, the second, the third and the fourth elements of the second level of the quadrant tree 108 in the singly linked linear list 500, can be executed in accordance to one of three scenarios: a) between two markers of the same (first) level; b) between the last marker of first level and the first marker of third level; c) after the last marker of first level (the last marker of first level at the moment immediately preceding the placing of markers of second level). The exact scenario used is identified by the fact, whether the fourth quadrant of the second level is a leaf of the quadrant tree, i.e. whether there are or there are no markers of third level. Furthermore, the scenario can additionally be identified by the fact that it concerns the placing of markers of second level after the last element of first level, and that the last element of the second level is the leaf of the quadrant tree, i.e. it does not have any child elements and, as a consequence, will not have markers of the third level.

So, in some embodiments of the present technology, when the parent quadrant of the first level of the quadrant three 108 is the fourth (the last) element of the first level of the quadrant tree 108, and when the fourth (the last) element of the second element of the quadrant tree 108 is the leaf of the quadrant tree (i.e. does not have any child elements), the placing in the singly linked linear list 500 of the first, the second, the third and the fourth markers is executed after the fourth marker of the first level, i.e. after the last marker in singly linked linear list 500 (at the moment of placing the four markers of the second level).

The example of this placing is shown in FIG. 7. FIG. 7 shows the singly linked linear list 500 as if the first three elements of the first level of the quadrant tree 108 are the quadrant tree leaves, and the fourth element of the first level of the quadrant tree 108 is a quadrant tree nod (i.e. as it is shown in FIG. 2), and as if all four elements of the second level of the quadrant tree 108 are the quadrant tree leaves. In other words, FIG. 7 shows the quadrant tree 108 as if the fourth element of the second level of the quadrant tree 108 (quadrant tree element with vertices LNKD as is it shown in FIG. 4) does not have any child elements.

FIG. 7 shows the singly linked linear list 500 with the first marker of the first level 522, the second marker of the first level 524, the third marker of the first level 526 and the fourth marker of the first level 528 placed therein.

Additionally, in FIG. 7 after the fourth marker of the first level 528 are depicted four markers of the second level: a first marker of second level 702, a second marker of the second level 704, a third marker of the second level 706 and a fourth marker of the second level 708.

As it can be seen in FIG. 7, the four markers of the second level 702, 704, 706 and 708 are located after the last marker of the first level 528.

The first marker of the second level 702 is an reference to a beginning of a portion 510 of the singly linked linear list 500, where the objects, located in the leaf 318 of the second level 206 of the quadrant tree 108, are located.

The second marker of the second level 704 is a reference to a beginning of a portion 512 of singly linked linear list, where the objects, located in the leaf 320 of the second level 206 of the quadrant tree 108, are located.

The third marker of the second level 706 is an reference to a beginning of a portion 514 of the singly linked linear list, where the objects, located in the node 322 of the second level 206 of the quadrant tree 108, are located.

The fourth marker of the second level 708 is an reference to a beginning of a portion 516 of the singly linked linear list, where the objects, located in the node 324 of the second level 206 of the quadrant tree 108, are located.

In some implementations of the present technology, when the fourth (the last) element of the second element of the quadrant tree 108 is a quadrant tree nod (i.e. has child elements of the third level), the placing into the singly linked linear list 500 of the first, the second, the third and the fourth markers of the second level is done between the corresponding marker of the first level being the marker of parent element of the first level and the first marker of the third level.

Figure 8:
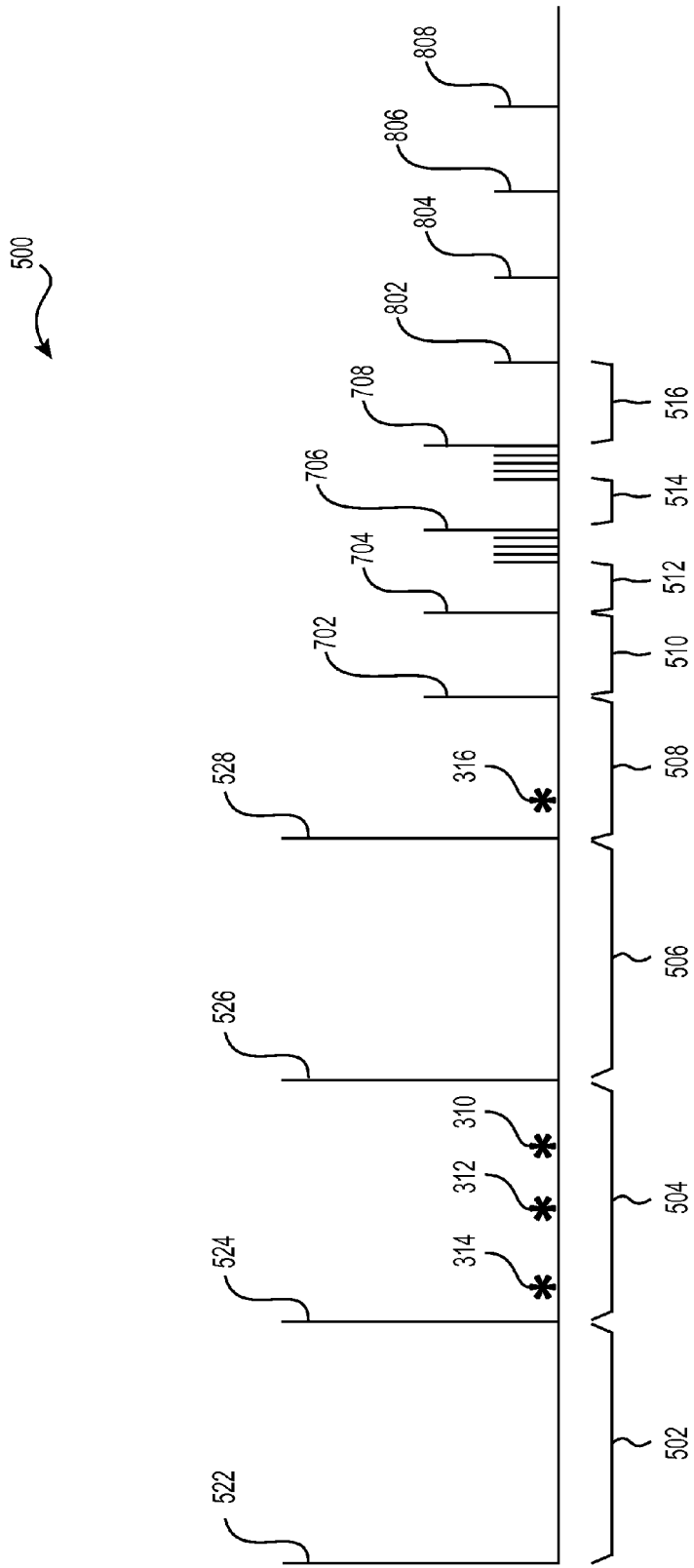
FIG. 8 is a schematic representation of an embodiment of the linear which contains markers of the first, the second and the third level, and the singly linked linear list further containing objects from elements of the first level of the quadrant tree, the singly linked linear list implemented in accordance with non-limiting embodiments of the present technology.

The example of this placing is shown in FIG. 8. Parent element of the first level in FIG. 8 is the fourth element of the first level.

FIG. 8 shows the singly linked linear list 500 as if the first three elements of the first level of the quadrant tree 108 would be quadrant tree leaves, and the fourth element of the first level of the quadrant tree 108 would be quadrant tree node, and as if the first element of the second level of the quadrant tree 108 would be the quadrant tree leaf, and the second, the third and the fourth elements of the second level 204 of the quadrant tree 108 would be quadrant tree node (i.e. as it shown in FIG. 2).

Thus, FIG. 8 shows the singly linked linear list 500 with the first marker of the first level 522, the second marker of the first level 524, the third marker of the first level 526, the fourth marker of the first level 528 placed therein.

Additionally, in FIG. 8 after the marker 528 of the first level, there are depicted four markers of the second level: a first marker of second level 702, a second marker of the second level 704, a third marker of the second level 706 and a fourth marker of the second level 708.

The first marker of the second level 702 is a reference to a beginning of a portion 510 of the singly linked linear list, where the objects, located in the leaf 318 of the second level 206 of the quadrant tree 108, are located.

The second marker of the second level 704 is a reference to a beginning of a portion part 512 of the singly linked linear list, where the objects, located in the leaf 320 of the second level 206 of the quadrant tree 108, are located.

The third marker of the second level 706 is a reference to a beginning of a portion 514 of the singly linked linear list, where the objects, located in the node 322 of the second level 206 of the quadrant tree 108, are located.

The fourth marker of the second level 708 is a reference to a beginning of a portion 516 of the singly linked linear list, where the objects, located in the node 324 of the second level 206 of the quadrant tree 108, are located.

Such placing of the markers shows the structure of the first and the second levels of the quadrant tree 108 depicted in FIG. 2. As shown in FIG. 2, from the four elements of the first level 204 of the quadrant tree 108 only one element is quadrant tree node (node 308).

Node, by definition, is an element of quadrant tree having four child elements. As such, it is shown in FIG. 7 that after each of the first tree markers of the first level 522, 524 and 526 there are no markers of the second level 206 of the quadrant tree 108, however, these four markers of the second level are placed after the fourth marker of the first level 528. The presence of the markers of the second level 702, 704, 706 and 708 of the second level of the quadrant tree 108 is explained by the fact that the fourth marker of the first level 528 of the first level 204 of the quadrant tree 108 is related to the node 308 having four child elements: one leaf 318 and three nodes 320, 322 and 324.

Furthermore, three elements of the second level 206 of the quadrant tree 108 have child elements of the third level 208 of the quadrant tree 108, namely, child elements of quadrant tree nodes 320, 322, 324. Accordingly, after the three markers of the second level 704, 706 and 708 there are three sets of markers of the third level. Markers of the third level are placed after markers of the second level 704 and 706 are not numbered. Markers of the third level placed after marker of the second level 708 are numbered as a first marker of the third level 802, a second marker of the third level 804, a third marker of the third level 806 and a fourth marker of the third level 808.

Accordingly, FIG. 8 shows that when the fourth (the last) element of the second element of the quadrant tree 108 is a quadrant tree nod (i.e. has child elements of the third level), the placing into the singly linked linear list 500 of the first, the second, the third and the fourth markers of the second level is done between the corresponding marker of the first level being the marker of the parent element of the first level and the first marker of the third level. In this case the four markers of the second level (702, 704, 706, 708) are located between the fourth marker of the first level 528 and the first marker of the third level 802.

In some implementations of the present technology, when the fourth (the last) element of the second element of the quadrant tree 108 is a leaf of the quadrant tree (i.e. does not have child elements of the third level), and when the parent quadrant of the first level is not the fourth (the last) element of the first level of the quadrant tree 108 the placing into the singly linked linear list 500 of the first, the second, the third and the fourth markers of the second level is done between corresponding marker of the first level being the marker of parent element of the first level and directly following after it another marker of the same level.

Such placing is due to the fact that the marker the of parent element of the first level of the quadrant tree 108, prior to the set of markers of the second level, is not the last marker of the first level, and to the fact that the markers of the third level are not located after the last marker of the second level, due to the forth tree element of the second level of quadrant tree being the leaf of the quadrant tree.

The method 1000 then proceeds to step 1008.

Step 1008—placing in singly linked linear list of the objects stored in any of: the first, the second, the third and the fourth element of the second level of the quadrant tree after the first, the second, the third and the fourth markers of second level accordingly.

Then, at step 1008, the server 102 places the objects stored in elements of the second level of quadrant tree 108 into singly linked linear list 500.

The placing in singly linked linear list 500 of the objects stored in elements of the second level of the quadrant tree 108 is done after the corresponding markers of second level, as shown in FIG. 9.

FIG. 9 similar to the FIG. 6 and FIG. 7 shows the development of the process of the object placing into singly linked linear list 500.

As was shown in FIG. 4, one of the four elements of the second level 206 of the quadrant tree 108 does not comprise objects (leaf 318) and the other three elements of second level 206 of the quadrant tree 108 do comprise objects (node 320, 322 and 324).

So, the node 320 contains one object 326.

The node 322 contains two objects—the object 328 and object the 330.

The node 324 contains the object 332.

All these objects—326, 328, 330 and 332—are also located in the singly linked linear list 500.

Accordingly, after the first marker of the second level 702, i.e. in the portion 510 of the singly linked linear list 500, there are no objects due to the fact that the leaf 318 has no objects.

After the second marker of the second level 704, i.e. in the portion 512 of singly linked linear list 500, the object 326 is located, i.e. the single object located in the node 320.

After the third marker of the second level 706, i.e. in the portion 514 of the singly linked linear list 500, the objects 328 and 330 are located, i.e. all the objects located in the node 322.

After the fourth marker of the second level 708, i.e. in the portion 516 of the singly linked linear list 500, the object 332 is located, i.e. the object located in the node 324.

Objects 310, 312 and 314 associated with the second element of the first level 204 of the quadrant tree 108 are located after the second marker of the first level 524, i.e. in the portion 504 of the singly linked linear list 108.

As can be seen in FIG. 9, the object 316 is located in the portion 508 of the singly linked linear list 500, i.e. in the portion that contains objects located in the node 308, the node 208 being the node of the first level of the quadrant tree 108.

As those skilled in the art will understand, objects placed in singly linked linear list 500 are placed therein as the nods of singly linked linear list. That means that objects are not only mediums of the certain information about the object itself but also contain the link to next singly linked linear list node. Thus, next singly linked linear list 500 node may be any other marker or object. As it shown in FIG. 9, the chain of links looks as following: the first marker of the first level 522→the second marker of the first level 524→object 314→object 312→object 310→the third marker of the first level 526→the fourth marker of the first level 528→object 316→the first of the second level 702→the second marker of the second level 704→object 324→the third marker of the second level 706→object 330→object 328→the fourth marker of the second level 708→object 332→the first marker of the third level 802→the second marker of the third level 804→the third marker of the third level 806→the fourth marker of the third level 808.

In some implementations of the present technology, method 1000 further includes receiving of new objects. Received new objects are placed into the corresponding element of the quadrant tree 108 and concurrently into the corresponding portion of the singly linked linear list 500. The newly received object can be placed into the singly linked linear list 500 after the marker related to the corresponding element of the quadrant tree 108. It should be recalled that in the third element of the second level (node 322) originally there was only one object—the object 328. After adding the new object—an object 330, the object 330 is added in the very beginning of the corresponding portion (portion 514) of the singly linked linear list 500, i.e. after the corresponding marker 706.

In this implementation of the present technology, all the objects placed in the singly linked linear list 500 (objects 310, 312, 314, 316, 326, 328, 330 and 332) are the tags of graphical objects. That means that the certain information related to the object itself is the link to the database 106 entry where the detailed information stored in the graphical object.

In some implementations of the present technology a plurality of objects in a certain element of the second level 206 of the quadrant tree 108 can be constant. In this case, the server 102 can transform the part of the singly linked linear list 500, where the plurality of objects is located, into an array, and the dimensionality of the indicated array is equal to the number of objects in the indicated in a plurality of objects. Accordingly, instead of the corresponding markers of the second level, there can be placed a corresponding marker of the array.

As those skilled in the art will understand, objects placed in singly linked linear list 500 are placed therein as the nodes of the singly linked linear list 500. That means that the objects are not only mediums of the certain information about the object itself but also contain the link to next singly linked linear list node. Accordingly, the marker of an array comprises 1) a link to the array in database 106, and 2) a link to the next node of the singly linked linear list 500.

Figure 12:
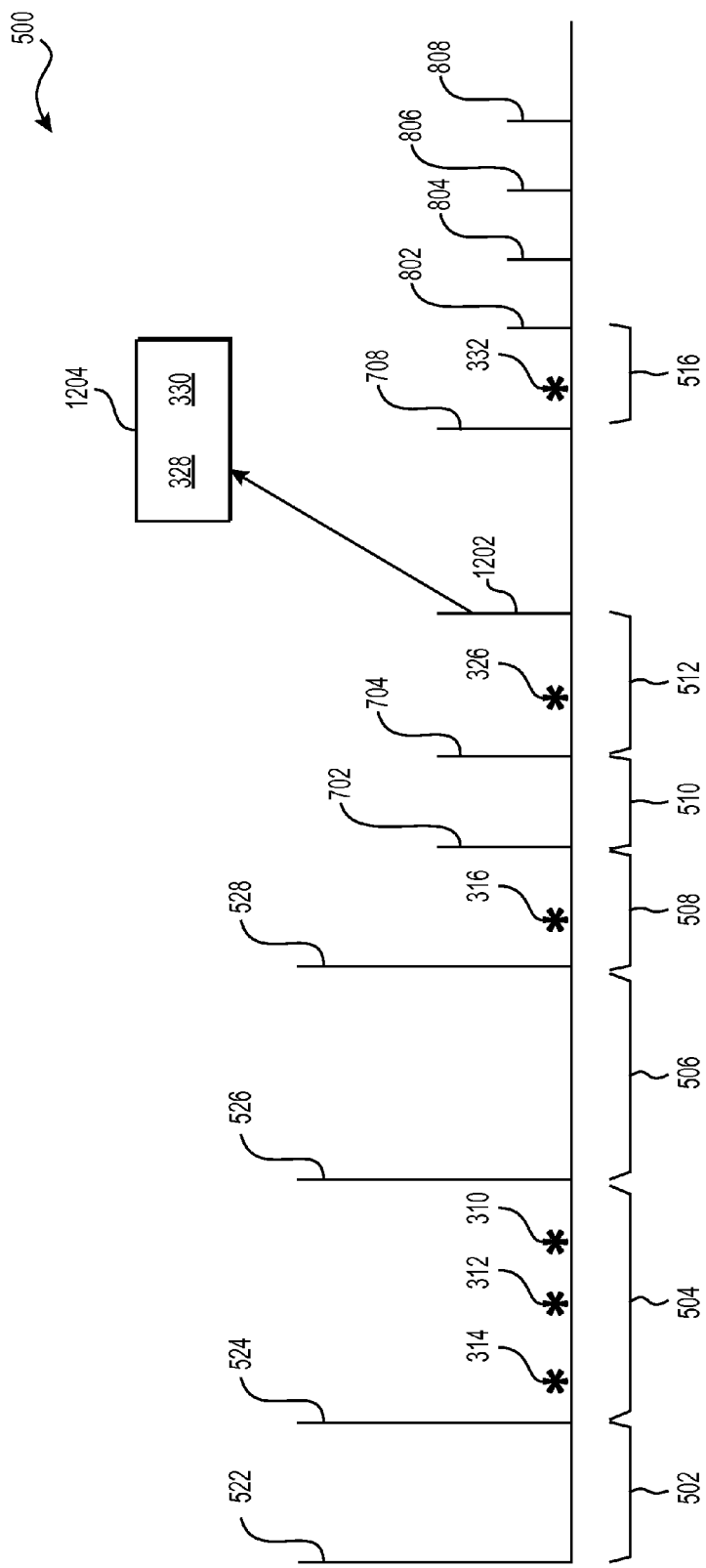
FIG. 12 is a schematic representation of an embodiment of the singly linked linear list which contains markers of the first, the second and the third level, the singly linked linear list further containing objects from elements of the first, the second and the third level of the quadrant tree, the singly linked linear list further includes an marker implemented in accordance with non-limiting embodiments of the present technology.

Referring to the example depicted in FIG. 12, the node 322 represented in FIG. 4 comprises constant unchangeable set of objects 328 and 330. As such, server 102 can transform the portion 514 of the singly linked linear list 500 depicted in FIG. 9 into an array 1204, schematically depicted in FIG. 12. Array 1204 comprises the objects 328 and 330 and the array 1204 is stored in the database 106 separately from the singly linked linear list 500. Thus, in the singly linked linear list 500 the marker 706 of the third element of the second level of the quadrant tree 108 (FIG. 9) is replaced by the corresponding marker of the array 1202 (FIG. 12). Marker 1202 is also a storage medium with the certain information related to the object itself (i.e. then link to the array 1204) and the marker comprises the link to next node of singly linked linear list 500 being in this case marker 708.

The method 1000 then terminates.

Figure 11:
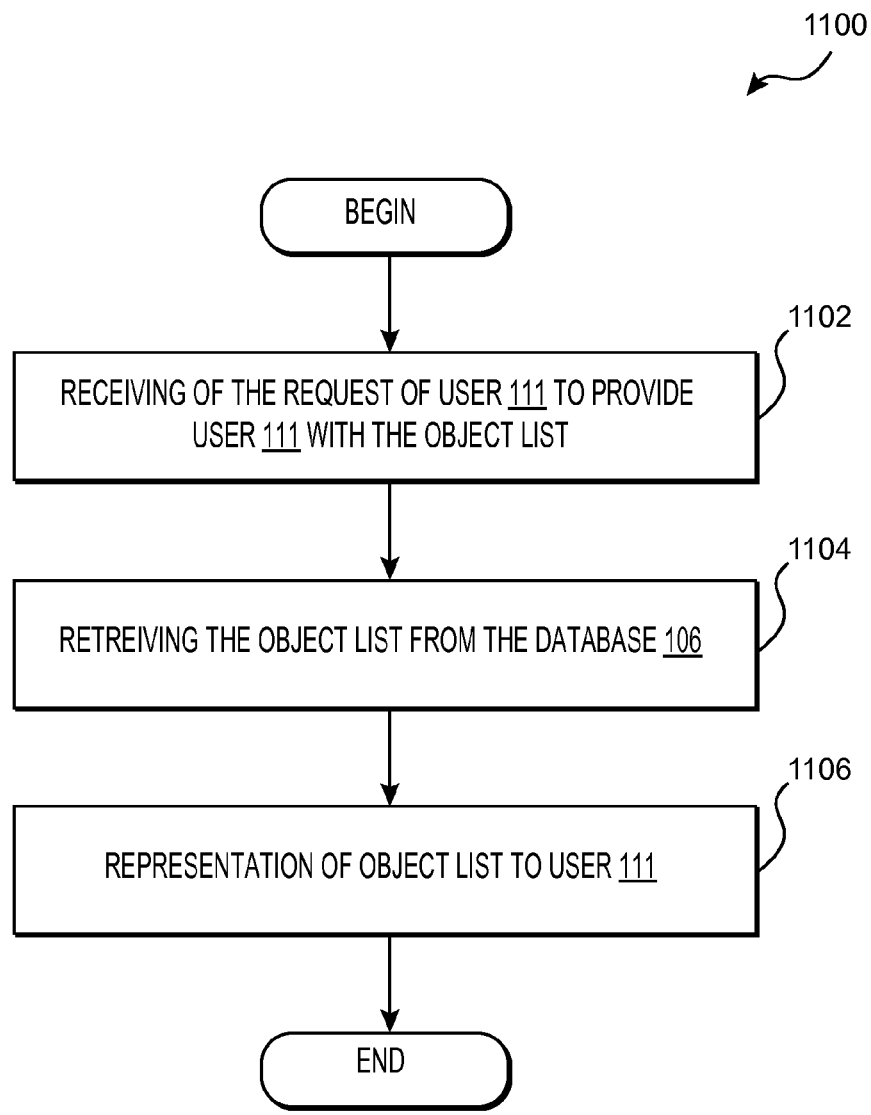
FIG. 11 is the schematic flowchart of a method, implemented on the server, depicted of the FIG. 1, the method being implemented in accordance with another non-limiting embodiment of the present technology.

FIG. 11 is the schematic flowchart of a method 1100, implemented on the server 102, depicted of the FIG. 1, the method 1100 being implemented in accordance with other non-limiting embodiments of the present technology.

In some embodiments of the present technology the method 1100 can be executable at the server 102 depicted in FIG. 1. For that purpose the server 102 includes the storage medium 104 storing computer-readable instructions which instructions when executed cause the server 102 to execute the steps of the method 1100. However, as known to those skilled in the art, the method 1100 can be executed on other servers.

Step 1102—receiving the request of user 111 to provide user 111 with the object list.

At step 1102, the server 102 receives, via the communication network 110 from the electronic device 112 a request of the user 111 to provide him with an object list.

Let it be assumed that database 106 stored on the server 102 is the database of real estate objects on sale, the real estate objects being located in Canada. Let it be assumed that the user 111 is interested in buying the real estate in the area of Montreal-Pierre Elliott Trudeau International Airport near Montreal. The user 111 uses the electronic device 112 to start the browser 116. The user 111 then types the URL of the website, using the browser 116, the website being one that can send requests to the database 106 located on the server 102. On the website user 111 can see the whole map of Canada and the menu allowing to choose a particular region of interest. Thus, the user 111 can limit the search by the way of choosing the corresponding fragment of space (i.e. a portion of the map). In this case, corresponding fragment of space can be selected by two means. The first way is a sequential choice in the menu of the interesting fragment of space. So, for example, if the user 111 is interested in finding real estate in the area of Montreal-Pierre Elliott Trudeau International Airport near Montreal he can first choose the province (Québec), then agglomeration (Island of Montreal) and then the municipality (Dorval). The second way is the zooming of the map (zoom in) with simultaneous centering in the search area with following selection of fragment of space with mouse in the area of Montreal-Pierre Elliott Trudeau International Airport. As those skilled in the art will understand, the selection of the area of interest could be effected by any other suitable way.

Method 1100 then proceeds to step 1104.

Step 1104—retrieving the object list from the database.

Responsive to a receipt of the user 111 request, the server 102 may identify in the database 106 the smallest quadrant from all the quadrants covering all fragments of space selected by user 111. Let it be assumed, for example, that the node 308 of quadrant tree 108 depicted in FIG. 2 is such a quadrant. The node 308 of quadrant tree 108 has four child elements which can also comprise objects related to the parts of territory covered by the node 308.

Next, the server 102 identifies that the node 308 comprises the indicator in the singly linked linear list 108 related to this element of quadrant tree, namely—indicator to the marker 526 (FIG. 9).

Method 1100 can provide the user 111 with the list of objects placed in the specified element of the quadrant tree 108 and in all of the specified four child elements of the second level of the quadrant tree 108, by providing the user 111 with objects placed in the singly linked linear list 500 in a certain interval, the certain interval being one of the: (1) an interval from the marker of the first level related to the given element of the quadrant tree 108 until the next marker of the first level when the given element of the quadrant tree 108 is one of the: the first, the second and the third element of the first level of the quadrant tree 108; or (2) an interval that starts at the fourth marker of the first level, the fourth marker being related to the given element of the quadrant tree 108, and finishes at the last object in the singly linked linear list 500, including this last object when given element of the quadrant tree 108 is the fourth element of the first level of quadrant tree 108. In other words, selection of the objects to be provided to the user 111 is executed from the element of the first level of quadrant tree 108 covering the whole selected fragment of space and from all child elements of this element of the first level of the quadrant tree 108.

In the above-described example, the node 308 is the fourth (the last) element of the first level of quadrant tree 108. As such, the server 102 chooses the objects from the interval starting from the fourth marker of the first level 528 and finishing at the last object in the singly linked linear list including this last object. That means that the server 102 selects the objects 316, 326, 330, 328, 332 from the singly linked linear list 500 (FIG. 9). Referring to FIG. 4, there is shown that the objects 316, 326, 330, 328 and 332—are the objects located within square with vertices HIGD, i.e. all objects contained in the node 308 (the first level), 318, 320, 322 and 324 (the second level). Selection from the objects of the singly linked linear list 500 is less resource-consuming than selection of objects directly from the quadrant tree 500. As such, implementations of present technology allow to save resources of server 102.

Since the objects 316, 326, 330, 328, 332 from singly linked linear list 500 are the tags of graphical objects, the server 102 further receives from the database 106 detailed information about real estate objects that are marked in the singly linked linear list 500 as graphical object tags.

In the example depicted in the FIG. 12, the node 322 represented in FIG. 4 comprises constant unchangeable set of objects 328 and 330. As such, the server 102 can transform the portion 514 of singly linked linear list 500 depicted in FIG. 9 into an array 1204, schematically depicted in FIG. 12. The array 1204 comprises objects 328 and 330 and is stored in the database 106 separately from the singly linked linear list 500. Thus, in the singly linked linear list 500 the marker 706 of the third element of the second level of the quadrant tree 108 (FIG. 9) is replaced by the corresponding marker of the array 1202 (FIG. 12). Marker 1202 is also a storage medium with the certain information related to the object itself (link to an array 1204) and the marker comprises the link to next node of singly linked linear list being in this case marker 708.

In case the portion of the singly linked linear list is transformed by the server 102 in an array, retrieving the objects from database 106 can be executed as follows.

Server 102 receives and provides the user 111 with the list of objects located in the corresponding element of the first level 204 of the quadrant tree 108 and in all child elements of the second level of the quadrant tree 108 by providing user with the objects located in: (i) the singly linked linear list 500 in the certain interval, and the certain interval is identified as the one of: (a) interval from the marker of the first level related to corresponding element of the first level of the quadrant tree 108 until the next marker of the first level when the n-element of the quadrant tree 108 is one of the: the first, the second and the third element of the first level of the quadrant tree 108; (b) interval starts at the marker of the first level related to the fourth element of the quadrant tree 108, and finishes at the last object in the singly linked linear list 500, including this last object when the corresponding element of the quadrant tree 108 is the fourth element of the first level of the quadrant tree; and (ii) in all the arrays generated as the result of transformation of at least one the child elements of corresponding element of the first level of quadrant tree 108, comprising the constant set of objects. In other words, selection of the objects to be provided to user 111 is effected from the element of the first level of quadrant tree 108 covering the whole selected fragment of space and from all child elements of this element of the first level of quadrant tree 108.

In the above-mentioned example the user 111 was determined to find real estate objects on sale in the area of Montreal-Pierre Elliott Trudeau International Airport near Montreal. Let it be assumed, that the fragment of space corresponds to the node 308 of the quadrant tree 108. The node 308 is the fourth (the last) element of the first level of quadrant tree 108. As such, server 102 chooses objects from the interval starting from the fourth marker of the first level 528 and finishing at the last object in the singly linked linear list 500, including this last object, also from the array 1204 created as a result of transformation by the server 102 the portion 514 of singly linked linear list where the objects located in the node 322 of the second level 206 were placed of the quadrant tree 108. Hence, the server 102 selects objects 316, 326, 332 from the singly linked linear list 500 and objects 328 and 330 from the array 1204 (FIG. 12). Referring to FIG. 4, there is shown that the objects 316, 326, 330, 328 and 332—all these are objects located within square with vertices HIGD, i.e. all objects contained in node 308 (the first level), 318, 320, 322 and 324 (the second level).

Since the objects 316, 326, 330, 328, 332 are the tags of graphical objects, the server 102 further receives from the database 106 detailed information about estate objects that are marked in singly linked linear list 500 or in an array 1204 as graphical object tags. To this additional information can be related photos, detailed text description, the type of right to property, size, annual amount of tax, sale price and so on.

Method 1100 then proceeds to step 1106.

Step 1106—representation of object list to user 111.

At step 1106, the server 102 sends via communication network 110 the object list with the information related thereto to the electronic device 112 for displaying using the display 118.

The method 1100 then terminates.

In some implementations of present technology, the first level 204 of the quadrant tree 108 is any level of the quadrant tree 108, including the root level of the quadrant tree, and the second level of the quadrant tree is the lower level of the quadrant tree, which directly follows the first level of the quadrant tree. All or some above-described implementations of present technology can be applied to any levels of the quadrant tree 108. So, for example, if the first level of quadrant tree is the fourteenth level of quadrant tree, counting from the root level of quadrant tree, the second level of quadrant tree will be the fifteenth level of quadrant tree, counting from the root level, the third level of quadrant tree will be the sixteenth level of quadrant tree, counting from the root level, etc. As such, the above-described technology is not limited to the cases where the first level of quadrant tree 108 is the root level of quadrant tree 108 and the second and the third levels of the quadrant tree 108 are accordingly the second and the third level, counting from the root level of quadrant tree 108.

Within the present description it should be understood that in all places where indicated the receiving data from any electronic device and/or from any email server and/or from any other server, the receiving of electronic or any other signal from suitable electronic device (server, email server) can be used, and the displaying on the device screen can be implemented as the transmission the signal to the display comprising certain information which further can be interpreted in a certain way and at least partially displayed on the screen of the electronic device. Transmitting and receiving of the signal are not mentioned everywhere within present description to simplify the description and for a better understanding of present solution. Signals can be transmitted by optical methods (for example, via fiber-optic connection), by electronic methods (via wired or wireless connection), by mechanical methods (transmitting of the pressure, temperature and/or other physical parameters by means of which the transmission of the signal is possible).

What is claimed is:

1. A method of retrieving an object list, the method executable at a server coupled to a database, the database storing a quadrant tree comprising plurality of objects and a respective database entry storing detailed information for each one of the plurality objects, the quadrant tree including elements of the quadrant tree, each element of the quadrant tree being one of: a node and a leaf of the quadrant tree; an n-element of the quadrant tree being one of: a first element of a first level of the quadrant tree, a second element of the first level of the quadrant tree, a third element of the first level of the quadrant tree and a fourth element of the first level of the quadrant tree, and the n-element comprising four elements of a second level of the quadrant tree, the method comprising:

aligning the quadrant tree into a singly linked linear list, the singly linked linear list being a data structure stored in the database, by:

placing a first, a second, a third and a fourth markers of the first level, that correspond to a reference to the first, the second, the third and the fourth elements of the first level of the quadrant tree, into the singly linked linear list;

placing respective objects stored in any of: the first, the second, the third and the fourth element of the first level of the quadrant tree after a respective one of the first, the second, the third and the fourth marker of the first level accordingly into the singly linked linear list;

placing a first, a second, a third and a fourth markers of the second level, that correspond to a reference to a first, a second, a third and a fourth elements of the second level of the quadrant tree, into the singly linked linear list, and wherein the placing is after one of the first, the second, the third and the fourth marker of the first level related to the n-element of the quadrant tree, and before directly following a first marker of a third level, when the fourth element of the second level of quadrant tree is a quadrant tree node;

is after one of the first, the second, the third and the fourth marker of the first level related to the n-element of the quadrant tree, and before a directly following another marker of the same level when the n-element of the first level of quadrant tree is one of: the first, the second, the third element of the first level of quadrant tree, and when the fourth element of the second level of quadrant tree is the leaf of quadrant tree;

is after the fourth marker of the first level, when the n-element of the first level of the quadrant tree is the fourth element of the first level of quadrant tree, and when the fourth element of the second level of quadrant tree is the leaf of the quadrant tree;

placing objects stored in any one of: the first, the second, the third and the fourth element of the second level of the quadrant tree into the singly linked linear list, the placing executed after the first, the second, the third and the fourth markers of second level accordingly;

receiving from an electronic device associated with a user, a request for providing to the electronic device the object list placed in the n-element of the quadrant tree and in the four elements of the second level of the n-element comprising the n-element of the quadrant tree, the request being a selection of a corresponding fragment of space by the user;

identifying the n-element of the quadrant tree as corresponding to the fragment of the space selected by the user;

retrieving, from the database, the object list and the detailed information associated with each of the objects associated with the object list, placed in said n-element of the quadrant tree and in said four elements of the second level of the quadrant tree, by selecting objects placed in the singly linked linear list based on a certain interval of the markers referenced by the n-element of the quadrant tree corresponding to the fragment of the space selected by the user, the certain interval being the n-element of the first level of the quadrant tree covering the selected fragment of space; and transmitting to the electronic device the object list with the detailed information associated with each of the objects associated with the objet list.

2. The method of claim 1, further comprising:

receiving a new object, placing the new object into an o-element of the quadrant tree, placing the new object in the singly linked linear list after a marker related to the o-element of the quadrant tree.

3. The method of claim 1, wherein the object is a tag of a graphical object.

4. The method of claim 1, further comprising wherein identifying the n-element of the quadrant tree as corresponding to the fragment of the space selected by user is executed by selecting a smallest element of the quadrant tree from all of the quadrant tree elements fully covering the user-selected fragment of space.

5. The method of claim 4, wherein a plurality of objects in any of the elements of the second level of the quadrant tree is constant, the method further comprising transforming a part of the singly linked linear list, where said plurality of objects is placed, into an array, such that the dimensionality of the array is representative of the number of the objects in said plurality of objects, and said element of the second level of the quadrant tree comprises plurality of indexes, each index of said plurality of indexes corresponding to a specific object from said plurality of objects.

6. The method of claim 5, wherein a plurality of objects in an at least one child element of the n-element of the quadrant tree is constant, the method further comprising providing a list of objects, placed in said n-element of the first level of the quadrant tree and in said four child elements of the second level of the quadrant tree, by providing the objects placed in:

(i) the singly linked linear list in a certain interval, and the certain interval is selected as one of: (a) an interval starting at the marker of the first level related to the n-element of the quadrant tree until the next marker of the first level, when the n-element of the quadrant tree is one of the: the first, the second and the third element of the first level of the quadrant tree; (b) an interval starting at the marker of the first level related to the n-element of the quadrant tree and finishing at the last object in the singly linked linear list, including this last object, when the n-element of the quadrant tree is the fourth element of the first level of the quadrant tree; and (ii) all the arrays generated as the result of transformation of an at least one child element of the n-element of the first level of quadrant tree, which the at least one child element of the n-element of the first level of quadrant tree comprise a constant plurality of objects.

7. The method of claim 1, wherein the certain interval being one of:

an interval from the marker of the first level related to the n-element of the quadrant tree until the next marker of the first level, when the n-element of the quadrant tree is one of the: the first, the second and the third element of the first level of quadrant tree;

an interval starting at the fourth marker of the first level, the fourth marker related to the n-element of the quadrant tree, and finishing at the last object in the singly linked linear list, including said object, when the n-element of the quadrant tree is the fourth element of the first level of the quadrant tree.

8. The method of claim 1, wherein the first level of the quadrant tree is any level of the quadrant tree, and the second level of the quadrant tree is a lower level of the quadrant tree, which directly follows the first level of the quadrant tree.

9. Computer comprising a processor, the processor being configured to execute:

acquiring an n-element of a quadrant tree maintained by a database, the quadrant tree comprising a plurality of objects, the database comprising a respective database entry storing detailed information for each one of the plurality of objects, the quadrant tree being one of: a first element of a first level of the quadrant tree, a second element of the first level of the quadrant tree, a third element of the first level of the quadrant tree and a fourth element of the first level of the quadrant tree, an n-element comprising four elements of a second level of the quadrant tree;

aligning the quadrant tree into a singly linked linear list, the singly linked linear list being a data structure stored in the database, by:

placing a first, a second, a third and a fourth markers of the first level, that correspond to a reference to the first, the second, the third and the fourth elements of the first level of the quadrant tree, into a singly linked linear list;

placing respective objects stored in any of: the first, the second, the third and the fourth element of the first level of the quadrant tree after a respective one of the first, the second, the third and the fourth marker of the first level accordingly into the singly linked linear list;

placing a first, a second, a third and a fourth markers of the second level, that correspond to a reference to first, a second, a third and a fourth elements of the second level of the quadrant tree, into the singly linked linear list, and wherein the placing:

is executed after one of the first, the second, the third, and the fourth marker of the first level related to the n-element of the quadrant tree, and before directly following a first marker of a third level, when the fourth element of the second level of quadrant tree is a quadrant tree node;

is executed after the one of the first, the second, the third, and the fourth marker of the first level related to the n-element of the quadrant tree, and before a directly following another marker of the same level when the n-element of the first level of quadrant tree is one of: the first, the second, the third element of the first level of quadrant tree, and when the fourth element of the second level of quadrant tree is the leaf of quadrant tree;

is executed after the fourth marker of the first level, when the n-element of the first level of the quadrant tree is the fourth element of the first level of quadrant tree, and when the fourth element of the second level of quadrant tree is the leaf of the quadrant tree;

placing objects stored in any one of: the first, the second, the third and the fourth element of the second level of the quadrant tree into the singly linked linear list, the placing executed after the first, the second, the third and the fourth markers of second level accordingly;

receiving from an electronic device associated with a user, a request for providing to the electronic device the object list placed in the n-element of the quadrant tree and in the four elements of the second level of the n-element comprising the n-element of the quadrant tree, the request being a selection of a corresponding fragment of space by the user;

identifying the n-element of the quadrant tree as corresponding to the fragment of the space selected by the user;

retrieving, from the database, the object list and the detailed information associated with each of the objects associated with the object list, placed in said n-element of the quadrant tree and in said four elements of the second level of the quadrant tree, by selecting objects placed in the singly linked linear list based on a certain interval of the markers referenced by the n-element of the quadrant tree corresponding to the fragment of the space selected by the user, the certain interval being the n-element of the first level of the quadrant tree covering the selected fragment of space; and transmitting to the electronic device the object list with the detailed information associated with each of the objects associated with the objet list.

10. Computer of claim 9, wherein the processor is configured to render the computer to execute:

receiving a new object, placing the new object into an o-element of the quadrant tree, placing the new object in the singly linked linear list after a marker related to the o-element of the quadrant tree.

11. Computer of claim 9, wherein object is the tag of graphical object.

12. Computer of claim 9, wherein identifying the n-element of the quadrant tree as corresponding to the fragment of the space selected by user is executed by selecting a smallest element of the quadrant tree from all of the quadrant tree elements fully covering the user-selected fragment of space.

13. Computer of claim 12, wherein a plurality of objects in any of the elements of the second level of the quadrant tree is constant, the processor is configured to render the computer to execute transforming a part of the singly linked linear list, where said plurality of objects is placed, into an array, such that the dimensionality of the array is representative of the number of the objects in said plurality of objects, and said element of the second level of the quadrant tree comprises plurality of indexes, each index of said plurality of indexes corresponding to a specific object from said plurality of objects.

14. Computer of claim 13, wherein a plurality of objects in an at least one child element of the n-element of the quadrant tree is constant, the processor is configured to render the computer to execute providing a list of objects, placed in said n-element of the first level of the quadrant tree and in said four child elements of the second level of the quadrant tree, by providing the objects placed in:

(i) the singly linked linear list in a certain interval, and the certain interval is selected as one of: (a) an interval starting at the marker of the first level related to the n-element of the quadrant tree until the next marker of the first level, when the n-element of the quadrant tree is one of the: the first, the second and the third element of the first level of the quadrant tree; (b) an interval starting at the marker of the first level related to the n-element of the quadrant tree and finishing at the last object in the singly linked linear list, including this last object, when the n-element of the quadrant tree is the fourth element of the first level of the quadrant tree; and (ii) all the arrays generated as the result of transformation of an at least one child element of the n-element of the first level of quadrant tree, which the at least one child element of the n-element of the first level of quadrant tree comprise a constant plurality of objects.

15. Computer of claim 9, wherein the certain interval being one of:

an interval from the marker of the first level related to the n-element of the quadrant tree until the next marker of the first level, when the n-element of the quadrant tree is one of the: the first, the second and the third element of the first level of quadrant tree;

an interval starting at the fourth marker of the first level, the fourth marker related to the n-element of the quadrant tree, and finishing at the last object in the singly linked linear list, including said object, when the n-element of the quadrant tree is the fourth element of the first level of the quadrant tree.

16. Computer of claim 9, wherein the first level of the quadrant tree is any level of the quadrant tree, and the second level of the quadrant tree is a lower level of the quadrant tree, which directly follows the first level of the quadrant tree.

* * * * *